US012626655B2

(12) United States Patent
Zhai

(10) Patent No.: US 12,626,655 B2
(45) Date of Patent: May 12, 2026

(54) ORGANIC LIGHT EMITTING DIODE (OLED) PIXEL CIRCUIT REDUCING WEAK LIGHT EMISSION OF LIGHT-EMITTING ELEMENT IN NON-LIGHT EMITTING STAGE

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/759,629

(22) Filed: Jun. 28, 2024

(65) Prior Publication Data

US 2024/0355288 A1 Oct. 24, 2024

(30) Foreign Application Priority Data

Dec. 29, 2023 (CN) ......................... 202311868092.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/02* (2013.01); *G09G 2320/045* (2013.01); *G09G 2320/0626* (2013.01); *G09G 2330/02* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2320/0626; G09G 2320/0633; G09G 2320/064; G09G 2320/0646
USPC ...................................................... 345/76–83
See application file for complete search history.

(56) References Cited

U.S. PATENT DOCUMENTS

2015/0348465 A1* 12/2015 Sung .................... G09G 3/3233 345/77
2016/0027381 A1* 1/2016 Ryu ..................... G09G 3/3233 345/76
2016/0140894 A1* 5/2016 Eun ...................... H04N 13/356 345/212
2018/0025690 A1* 1/2018 Bao ...................... G09G 3/3225 345/691

(Continued)

*Primary Examiner* — Ke Xiao
*Assistant Examiner* — Nelson Lam
(74) *Attorney, Agent, or Firm* — KDW FIRM PLLC

(57) ABSTRACT

A display panel and a display device are provided. The display panel includes a pixel circuit and a light-emitting element, and the pixel circuit provides a driving current for the light-emitting element. The display panel includes a power supply voltage terminal, and the power supply voltage terminal provides a power supply voltage signal for the pixel circuit. The display panel includes a light emission stage and a non-light emission stage. In the light emission stage, the power supply voltage terminal provides a first voltage V1, and in the non-light emission stage, the power supply voltage terminal provides a second voltage V2, V1≠V2.

15 Claims, 14 Drawing Sheets

(56) References Cited

U.S. PATENT DOCUMENTS

| | | | | |
|---|---|---|---|---|
| 2019/0371232 | A1* | 12/2019 | Kim | G09G 3/2014 |
| 2020/0312229 | A1* | 10/2020 | Kim | G09G 3/32 |
| 2020/0394953 | A1* | 12/2020 | Kim | G09G 3/32 |
| 2022/0301500 | A1* | 9/2022 | Shigeta | G09G 3/32 |
| 2022/0327995 | A1* | 10/2022 | Kim | G09G 3/2014 |
| 2023/0104084 | A1* | 4/2023 | Yang | G09G 3/32 345/691 |
| 2023/0230550 | A1* | 7/2023 | Byun | G09G 3/3291 345/204 |

* cited by examiner

ORGANIC LIGHT EMITTING DIODE (OLED) PIXEL CIRCUIT REDUCING WEAK LIGHT EMISSION OF LIGHT-EMITTING ELEMENT IN NON-LIGHT EMITTING STAGE

CROSS-REFERENCE TO RELATED APPLICATION

This application claims priority to Chinese patent application No. 202311868092.0 filed with the China National Intellectual Property Administration (CNIPA) on Dec. 29, 2023, the disclosure of which is incorporated herein by reference in its entirety.

TECHNICAL FIELD

Embodiments of the present disclosure relate to display technology, and in particular to a display panel and a display device.

BACKGROUND

With the development of display technology, the application of display panels is becoming more and more common, and users have more and more requirements for the display quality of display panels. In order to satisfy the driving requirements of high-resolution display panels, for example, micro light emitting diodes (micro LED) or organic light emitting diodes (OLED), a pixel circuit combining pulse amplitude modulation (PAM) and pulse width modulation (PWM) is used, and a hybrid driving method is used to control the driving current intensity and the duration of the driving current to control the light-emitting state of the light-emitting element.

The pixel circuit includes multiple thin film transistors (TFT). Since TFT has a certain off-state leakage current, when TFT is turned off, the light-emitting element in the existing display panel structure still emits weak light, which affects the display effect.

SUMMARY

Embodiments of the present disclosure provide a display panel and a display device. In the display panel, the weak light emission of the light-emitting element in the non-light emission stage can be reduced or avoided by differentially designing the voltage values provided by the power supply voltage terminal in the light emission stage and the non-light emission stage, thereby improving the display effect.

Embodiments of the present disclosure provide a display panel, and the display panel includes: a pixel circuit and a light-emitting element. The pixel circuit provides a driving current for the light-emitting element.

The pixel circuit includes a power supply voltage terminal, and the power supply voltage terminal provides a power supply voltage signal for the pixel circuit.

The display panel includes a light emission stage and a non-light emission stage, in the light emission stage, the power supply voltage terminal provides a first voltage V1, and in the non-light emission stage, the power supply voltage terminal provides a second voltage V2, where V1≠V2.

Embodiments of the present disclosure provide a display device, which includes the display panel described in the first aspect.

The display panel according to the embodiments of the present disclosure includes a pixel circuit and a light-emitting element, and the pixel circuit provides a driving current for the light-emitting element. The display panel includes a power supply voltage terminal, and the power supply voltage terminal provides a power supply voltage signal for the pixel circuit. The display panel includes a light emission stage and a non-light emission stage. In the light emission stage, the power supply voltage terminal provides a first voltage V1, and in the non-light emission stage, the power supply voltage terminal provides a second voltage V2, where V1≠V2.

DETAILED DESCRIPTION

Figure 1:
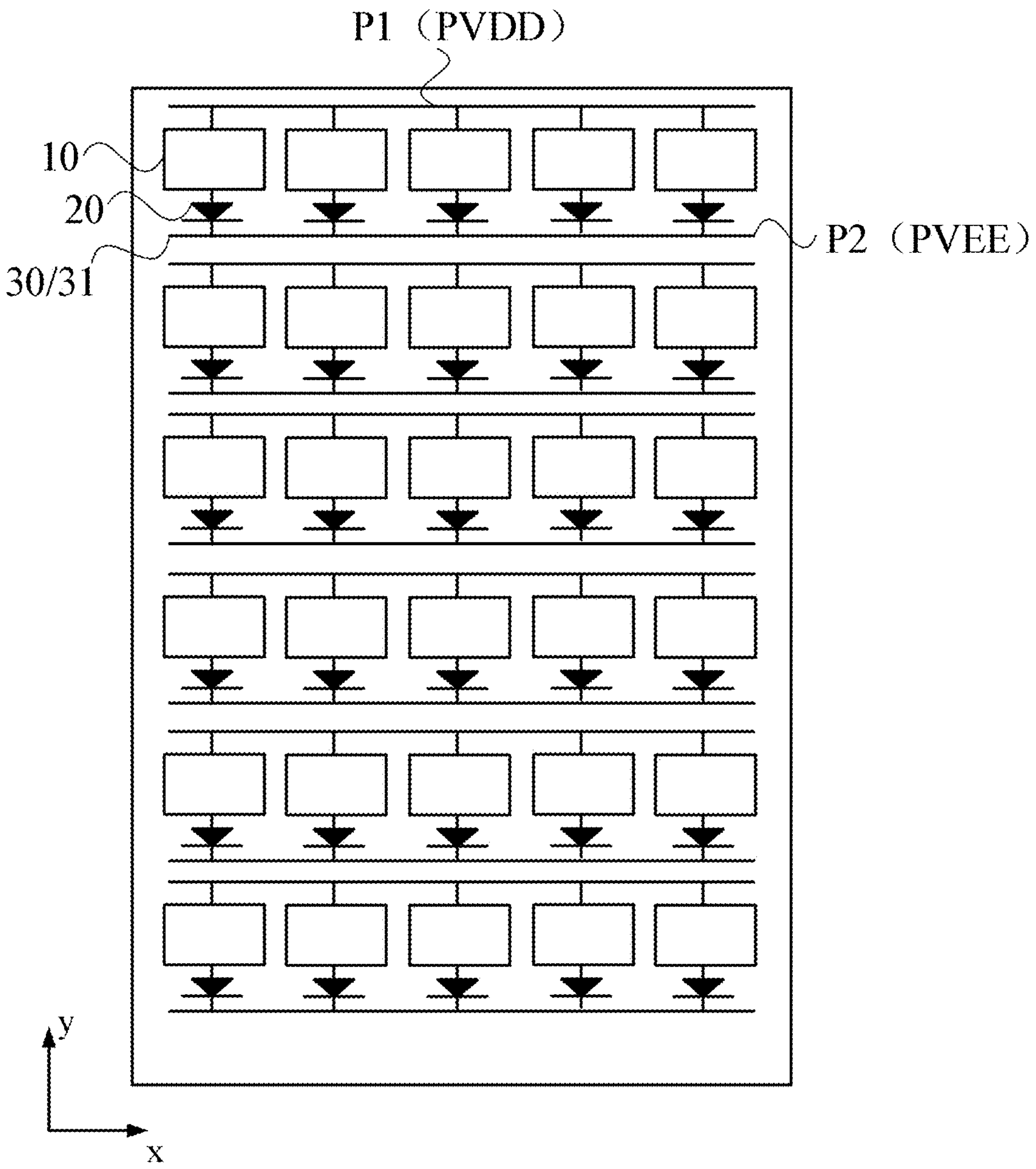
FIG. 1 is a schematic structural diagram of a display panel according to an embodiment of the present disclosure.

The present disclosure is described in detail hereinafter in conjunction with drawings and embodiments. It is to be understood that the specific embodiments set forth here are merely intended to illustrating rather than limiting the present disclosure. Additionally, it is to be noted that, for ease of description, only part, not all, of the structures related to the present disclosure are illustrated in the drawings.

The terms used in the embodiments of the present disclosure are only for the purpose of describing specific embodiments and are not intended to limit the present disclosure. It is to be noted that the directional words such as "upper", "lower", "left", and "right" described in the embodiments of the present disclosure are described at the angles shown in the drawings and should not be understood as limiting the embodiments of the present disclosure. In addition, in the context, it is to be appreciated that when it is mentioned that an element is formed "on" or "under" another element, it can not only be directly formed "on" or "under" another element, but also indirectly formed "on" or "under" another element through an intermediate element. The terms "first", "second", etc. are only used for descriptive purposes and do not indicate any order, quantity or importance, but are only used to distinguish different components. For ordinary technicians in this field, the specific meanings of the above terms in the present disclosure can be understood according to specific circumstances.

A display panel and a display device are provided according to embodiments of the present disclosure, to weaken or avoid the weak light emission of the light-emitting element in the non-light emission stage and improve the display effect. The various embodiments of the display panel and the display device according to embodiments of the present disclosure are described hereinafter in conjunction with the drawings.

Figure 2:
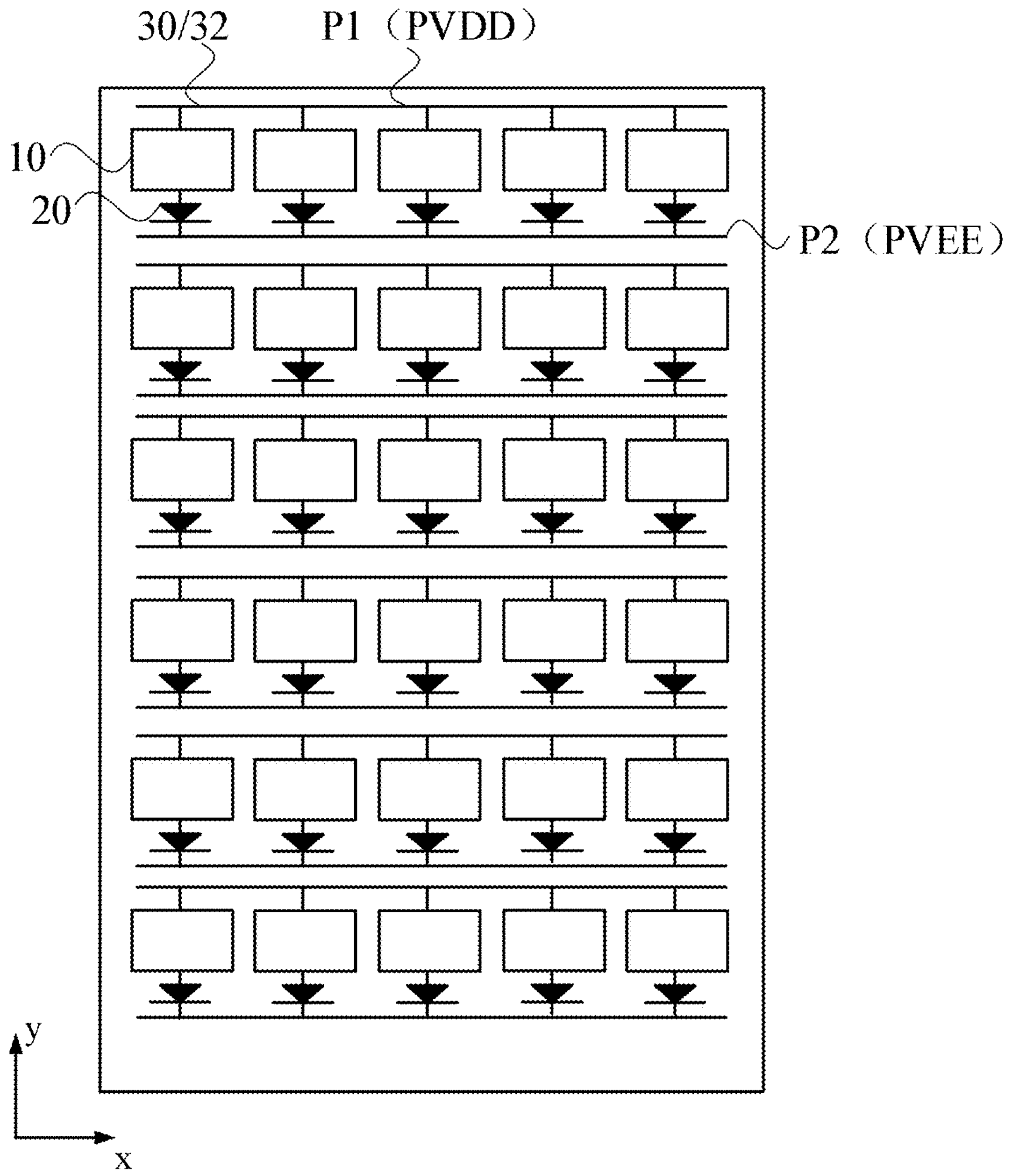
FIG. 2 is a schematic structural diagram of another display panel according to an embodiment of the present disclosure.

FIG. 1 is a schematic structural diagram of a display panel according to an embodiment of the present disclosure, and FIG. 2 is a schematic structural diagram of another display panel according to an embodiment of the present disclosure. Referring to FIG. 1 or FIG. 2, the display panel according to an embodiment of the present disclosure includes a pixel circuit 10 and a light-emitting element 20, and the pixel circuit 10 provides a driving current for the light-emitting element 20. The light-emitting element 20 may be a light-emitting element such as a micro LED or an OLED, and may be designed according to practical conditions during specific implementation. In an embodiment, the light-emitting element 20 may be an inorganic light-emitting element including a first electrode, a second electrode, and an inorganic semiconductor material set between the first electrode and the second electrode.

Multiple pixel circuits 10 and multiple light-emitting elements 20 may be arrayed in a first direction x and a second direction y, and the first direction x and the second direction y are parallel to the plane where the display panel is located, and the first direction x and the second direction intersect with each other. Exemplarily, the first direction x may be a row direction, and the second direction y may be a column direction.

The display panel includes a power supply voltage terminal 30, and the power supply voltage terminal 30 provides a power supply voltage signal for the pixel circuit 10. The display panel includes a light emission stage and a non-light emission stage, in the light emission stage, the power supply voltage terminal 30 provides a first voltage V1, and in the non-light emission stage, the power supply voltage terminal 30 provides a second voltage V2, where V1≠V2.

The light emission stage of the display panel is a display stage of the display panel. In the display stage, generally, multiple light-emitting elements 20 emit light to form a preset display screen. In the non-light emission stage of the display panel, it is a non-display stage of the display panel, at which time the light-emitting elements 20 do not emit light. Or in a driving mode of PWM (controlling the light emission duration)+PAM (controlling the amplitude of the driving current), the light-emitting elements 20 flash and emit light at a preset frequency when the display panel displays a screen, the display stage includes both the light emission stage and the non-light emission stage, and the non-display stage only includes the non-light emission stage. It can be understood that micro LED or OLED are both current-driven light-emitting elements. The display panel includes a positive power supply voltage terminal P1 and a negative power supply voltage terminal P2. The pixel circuit 10 and the light-emitting element 20 are set between the positive power supply voltage terminal Pl and the negative power supply voltage terminal P2. In the related art, the positive power supply voltage terminal P1 provides a constant positive power supply voltage PVDD (high voltage), and the negative power supply voltage terminal P2 provides a constant negative power supply voltage PVEE (low voltage). When the pixel circuit 10 makes the power supply voltage terminal P1 and the negative power supply voltage terminal P2 on, a driving current flows through the light-emitting element 20, and the light-emitting element 20 emits light. In this embodiment, when the light-emitting element 20 emits light, the first voltage V1 provided by the power supply voltage terminal 30 causes a preset voltage difference between the two electrodes of the light-emitting element 20, so that a driving current flows through the light-emitting element 20 to make the light-emitting element 20 emit light. In the non-light emission stage, the second voltage V2 provided by the power supply voltage terminal 30 may make the voltage difference between the two electrodes of the light-emitting element 20 be 0 or close to 0, and at this time, no driving current flows through the light-emitting element 20, thereby avoiding the light-emitting element 20 having weak light emission in the non-light emission stage and affecting the display effect.

If V1=V2, due to the existence of leakage current in TFT, there will be a certain current in the light-emitting element 20 even when it is not required the light-emitting element 20 to emit light. As the use time increases, the performance of the TFT may weaken, which will cause the light-emitting element 20 to emit weak light, thus affecting the display effect.

In the display panel according to the embodiment of the present disclosure, it is set V1≠V2, so that the weak light emission of the light-emitting element in the non-light emission stage can be reduced or avoided by differentially designing the voltage values provided by the power supply voltage terminal in the light emission stage and the non-light emission stage, thereby improving the display effect.

Figure 3:
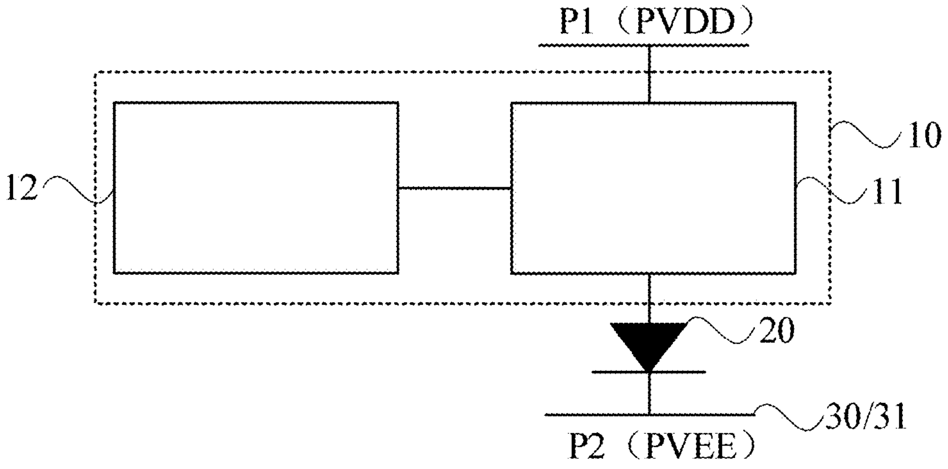
FIG. 3 is a schematic diagram of partial structure of the display panel shown in FIG. 1.
Figure 4:
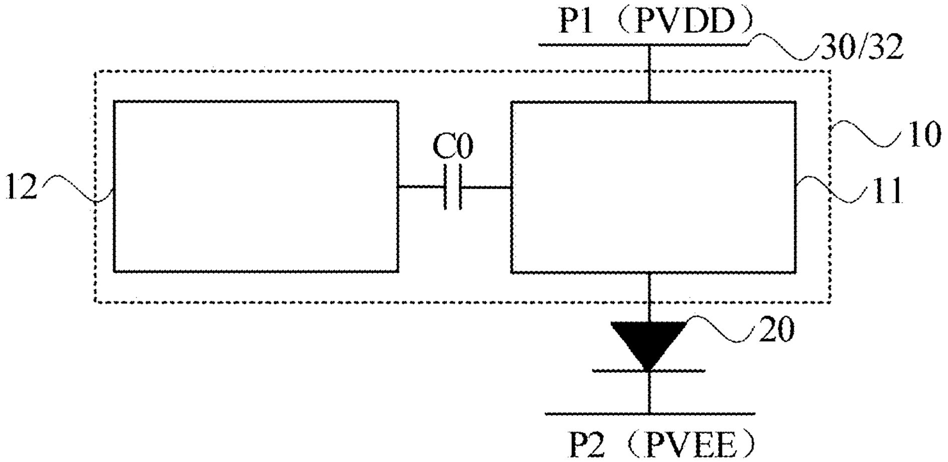
FIG. 4 is a schematic diagram of partial structure of the display panel shown in FIG. 2.

FIG. 3 is a schematic diagram of partial structure of the display panel shown in FIG. 1, and FIG. 4 is a schematic diagram of partial structure of the display panel shown in FIG. 2, where each of FIG. 3 and FIG. 4 shows a pixel circuit 10 and a light-emitting element 20 in FIG. 1 and FIG. 2. Referring to FIG. 3 or FIG. 4, in an embodiment, the pixel circuit 10 includes an amplitude modulation module 11 and a pulse width modulation module 12. The amplitude modulation module 11 and the pulse width modulation module 12 are connected, and the pixel circuit 10 generates a driving current under the control of the amplitude modulation module 11 and the pulse width modulation module 12. The amplitude modulation module 11 may be configured to control the amplitude of the driving current, and the pulse width modulation module 12 may be configured to adjust the pulse width of the voltage applied to a first electrode of the light-emitting element 20. The connection between the amplitude modulation module 11 and the pulse width modulation module 12 described here may be: a direct connection, that is, one terminal of the pulse width modulation module 12 is connected to the amplitude modulation module 11 through a wire (as shown in FIG. 3); or an indirect connection, for example, one terminal of the pulse width modulation module 12 is coupled to the amplitude modulation module 11 through a capacitor C0 (as shown in FIG. 4). The specific implementation may be designed according to practical conditions, and embodiments of the present disclosure do not limit this. It is to be noted that the direct connection mode shown in FIG. 3 is also applicable to the embodiment of FIG. 2, and the indirect connection mode shown in FIG. 4 is also applicable to the embodiment of FIG. 1. In an embodiment, one terminal of the pulse width modulation module 12 is directly connected or coupled through a capacitor C0 to the gate of a control transistor of the amplitude modulation module 11 (not shown in the figure), and the pulse width modulation module 12 is used to control the turn-on and turn-off of the control transistor, so as to control whether the amplitude modulation module 11 normally provides the driving current to the light-emitting element, that is, the pulse width modulation module 12 controls the light emission duration of the light-emitting element. In an embodiment, the control transistor may be a driving transistor of the amplitude modulation module 11, that is, one terminal of the pulse width modulation module 12 is directly connected to the driving transistor of the amplitude modulation module 11 or one terminal of the pulse width modulation module 12 is connected to the driving transistor of the amplitude modulation module 11 through the capacitor C0. In an embodiment, the control transistor may be a light-emission control transistor of the amplitude modulation module 11, and the light-emission control transistor selectively provides a driving current for the light-emitting element; that is, one terminal of the pulse width modulation module 12 is directly connected to the light-emission control transistor of the amplitude modulation module 11 or one terminal of the pulse width modulation module 12 is connected to the light-emission control transistor of the amplitude modulation module 11 through the capacitor C0.

The pulse width modulation module 12 adjusts the pulse width of the voltage applied to the first electrode of the light-emitting element 20, that is, the pulse width modulation module 12 adjusts the actual emission period of the driving current applied to the light-emitting element 20, and meanwhile maintains the driving current applied to the light-emitting element 20 at a constant level to adjust the grayscale or brightness displayed by the light-emitting element 20, rather than adjusting the magnitude of the driving current applied to the light-emitting element 20 to adjust the grayscale or brightness displayed by the light-emitting element. Therefore, the amplitude modulation module 11 is able to provide a driving current to the light emitting element 20 so that the light emitting element 20 is driven with the best light emission efficiency, and the pulse width modulation module 12 adjusts the light emission duty cycle of the light emitting element 20 (i.e., the emission period of the light emitting element) to adjust the grayscale or brightness displayed by the light emitting element 20. The following embodiments are all described in the driving mode of PAM+PWM.

Based on the above embodiment, in an embodiment, the display panel includes a first display mode and a second display mode, and a brightness of the display panel in the first display mode is different from a brightness of the display panel in the second display mode. In the first display mode, the power supply voltage terminal provides the first voltage V1 for a duration of T1, and in the second display mode, the power supply voltage terminal provides the first voltage V1 for a duration of T2, where T1≠T2.

It can be understood that when the driving current applied to the light-emitting element is maintained at a constant level so that the light-emitting element is driven at the best light emission efficiency, the energy utilization rate can be improved. Under this condition, to realize the first display mode and the second display mode with different light emission brightnesses of the display panel, for example, to display the same screen but present different brightnesses, it is necessary to adjust the lengths of the light emission periods of the two display modes to achieve different visual brightnesses because the brightnesses of the light-emitting element are basically the same during the same light-emission time due to the same magnitude of the driving currents. The duration of the first voltage V1 provided by the power supply voltage terminal corresponds to the length of the light emission period. If the brightness of the first display mode and the brightness of the second display mode are different, then T1≠T2. In this case, the power supply voltage terminal provides a second voltage V2 in the non-light emission stage, which not only realizes different brightness display of the display panel, but also avoids the light-emitting element from weakly emitting light in the non-light emission stage and affecting the display effect.

Figure 5:
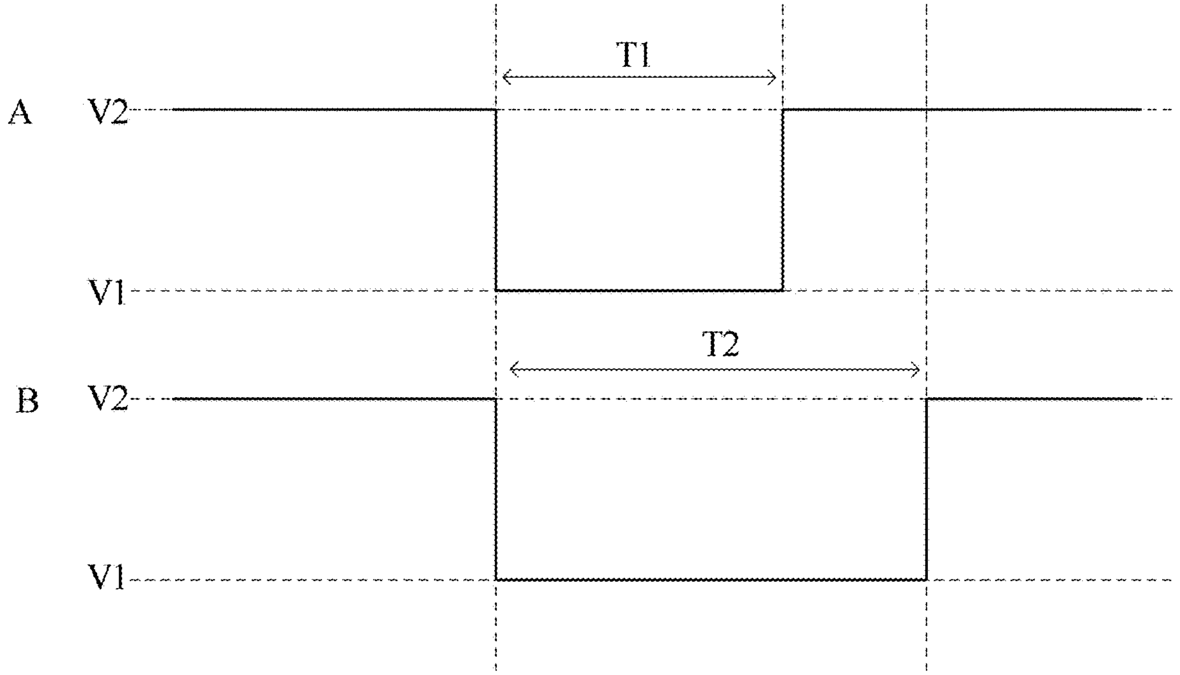
FIG. 5 is a schematic diagram of durations for which a power supply voltage terminal provides a first voltage in different display modes in a display panel according to an embodiment of the present disclosure.

For example, FIG. 5 is a schematic diagram of durations for which a power supply voltage terminal provides a first voltage in different display modes in a display panel according to an embodiment of the present disclosure. Referring to FIG. 5, it is taken as an example that the first voltage V1 is a low voltage, in an embodiment, the display panel includes a first display mode A and a second display mode B, the power supply voltage terminal provides the first voltage V1 for the duration of T1 in the first display mode A, and the power supply voltage terminal provides the first voltage V1 for the duration of T2 in the second display mode B, and the brightness of the display panel in the first display mode A is less than the brightness of the display panel in the second display mode B, and T1<T2.

In an embodiment, the power supply voltage terminal provides a first voltage V1 in the light emission stage and provides a second voltage V2 in the non-light emission stage, where the relationship between the first voltage V1 and the second voltage V2 is only schematic and is not a limitation to the embodiment of the present disclosure. When the brightness of the display panel in the first display mode A is less than the brightness of the display panel in the second display mode B, the duration of the light emission period in the second display mode B is longer, that is, T1<T2.

It can be understood that, accordingly, if the brightness of the display panel in the first display mode is greater than the brightness of the display panel in the second display mode, then T1>T2.

In an embodiment, referring to FIG. 3 or FIG. 4, the pixel circuit 10 includes an amplitude modulation module 11 and a pulse width modulation module 12, the amplitude modulation module 11 is configured to control the amplitude of the driving current, and the pulse width modulation module 12 is configured to output a pulse width modulation signal to control a duration of the driving current applied to the display panel, thereby realizing PAM+PWM control for the light-emitting element 20.

Figure 6:
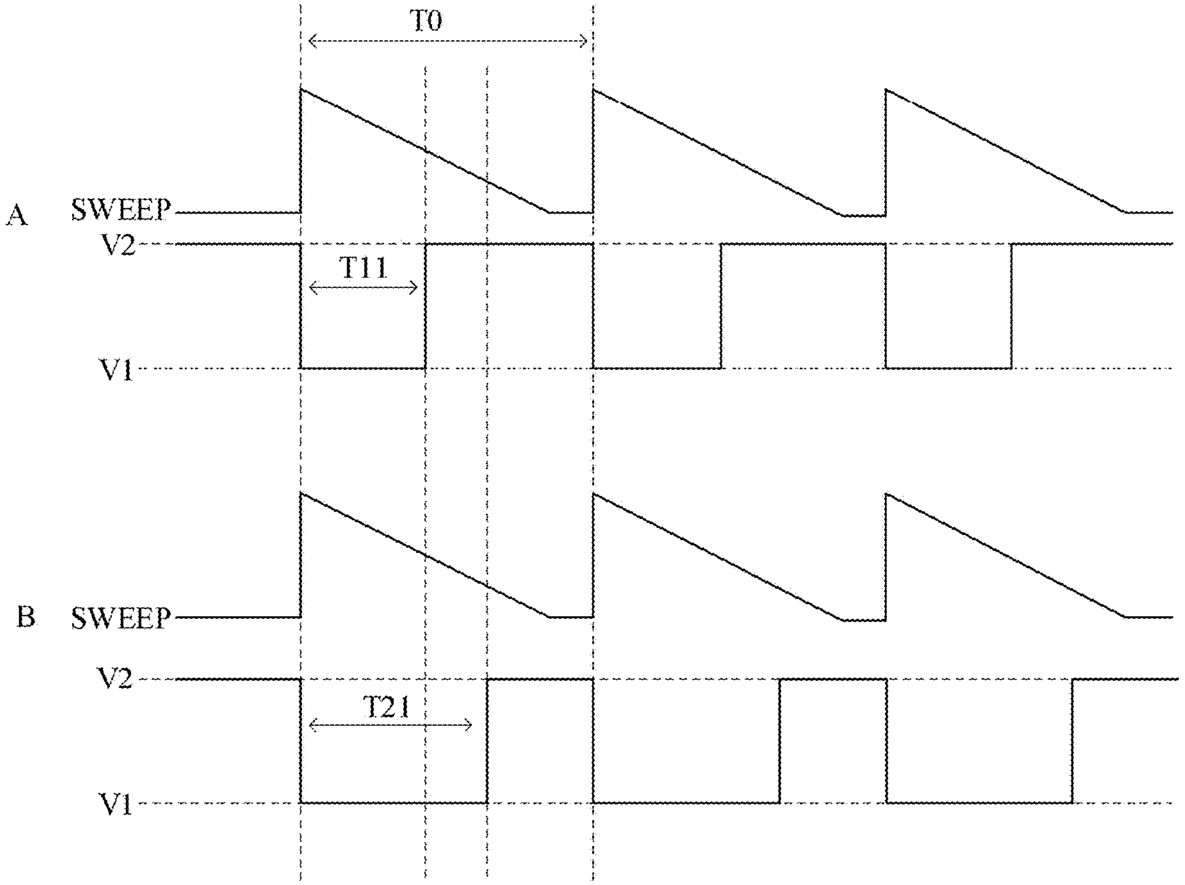
FIG. 6 is a schematic diagram of durations for which a power supply voltage terminal provides a first voltage in different display modes in a display panel according to an embodiment of the present disclosure.

In the embodiment shown in FIG. 5, the first display mode A and the second display mode B may be considered as a comparison of the overall light emission period when the display panel displays a frame of image. In the actual PWM+PAM dimming control, a frame of display screen corresponds to multiple cycles of sub-light emission periods. It can be understood that during the operation of the pixel circuit, the pulse width modulation module determines the time for the amplitude modulation module to load the driving current to the light-emitting element under the control of a data voltage signal and a sweep signal (SWEEP) of the pulse width modulation module, that is, determines the light emission duration. Exemplarily, FIG. 6 is a schematic diagram of durations for which a power supply voltage terminal provides a first voltage in different display modes in a display panel according to an embodiment of the present disclosure. Referring to FIG. 6, in the first display mode A and the second display mode B, the pulse width modulation module outputs pulse width modulation signals with the same frequency. In the first display mode A, the duration of the power supply voltage terminal providing the first voltage V1 within a pulse cycle T0 of the pulse width modulation signal is T11, and in the second display mode B, the duration of the power supply voltage terminal providing the first voltage V1 within a pulse cycle T0 of the pulse width modulation signal is T21, where T11<T21.

For the same pixel circuit, for the sake of driving simplicity, generally a pulse width modulation signal with a fixed frequency is used, corresponding to the sweep signal SWEEP with the same slope. By adjusting the pulse width modulation module 12 receiving the data voltage signals to be different in the first display mode A and the second display mode B, the duration of a sub-light emission stage (corresponding to T11) in the first display mode A and a sub-light emission stage (corresponding to T21) in the second display mode B are different. When the brightness in the first display mode A is less than the brightness in the second display mode B, the duty cycle of the first voltage V1 provided by the power supply voltage terminal within the pulse cycle T0 of the pulse width modulation signal in the second display mode B is greater, and the duration T11 of the power supply voltage terminal providing the first voltage V1 in the first display mode A is less than the duration T21 of the power supply voltage terminal providing the first voltage V1 in the second display mode B, that is, T11<T21.

In other embodiments, in the first display mode A and the second display mode B, the triangular wave signals in the sweep signals SWEEP received by the pulse width modulation module 12 may also include different slopes (voltage change rates).

In other embodiments, in the first display mode A and the second display mode B, the triangular wave signals in the sweep signals SWEEP received by the pulse width modulation module 12 may include different slopes, and the pulse width modulation module 12 may also receive different data voltage signals. With the pulse width modulation module 12 receiving different data voltage signals and the triangular wave signals in the sweep signals SWEEP including different slopes, the light emission durations of the light-emitting element are jointly adjusted to achieve different brightness displays.

In other embodiments, in the first display mode A and the second display mode B, the data voltage signals received by the amplitude modulation module 11 may also be adjusted to perform the adjustment of different grayscale displays.

In other embodiments, in the first display mode A and the second display mode B, by adjusting the amplitude modulation module 11 receiving different data voltage signals and the pulse width modulation module 12 receiving different data voltage signals, the adjustment of different grayscale displays are jointly performed.

In other embodiments, in the first display mode A and the second display mode B, by adjusting the amplitude modulation module 11 receiving different data voltage signals and the triangular wave signals in the sweep signals SWEEP including different slopes, the adjustment of different grayscale displays are jointly performed.

Continuing to refer to FIG. 1 or FIG. 3, in an embodiment, the power supply voltage terminal 30 includes a first power supply voltage terminal 31, and the first power supply voltage terminal 31 is coupled to the pixel circuit 10 through the light-emitting element 20.

In the light emission stage, a first voltage provided by the first power supply voltage terminal 31 is V11, and in the non-light emission stage, a second voltage provided by the first power supply voltage terminal 31 is V21; where V11<V21.

In this embodiment, the first power supply voltage terminal 31 is connected to a second electrode (cathode) of the light-emitting element 20, and the first power supply voltage terminal 31 is the negative power supply voltage terminal P2. In the light emission stage, the first voltage V11 provided by the first power supply voltage terminal 31 to the second electrode of the light-emitting element 20 is a low voltage, for example, the negative power supply voltage PVEE in the related art, so as to ensure that the driving current is output from the pixel circuit 10 and flows through the light-emitting element 20 to ensure that the light-emitting element 20 emits light normally. In the non-light emission stage, a second voltage V21 provided by the first power supply voltage terminal 31 to the second electrode of the light-emitting element 20 is a high voltage, for example, the positive power supply voltage PVDD in the related art, that is, the voltage value of the second voltage V21 is equal to the positive power supply voltage, so that even if the thin film transistor in the pixel circuit 10 has an off-state leakage current, the situation in which the light-emitting element 20 emits light weakly in the non-light emission stage can be avoided because there is no voltage difference between the two terminals of the light-emitting element 20 or the voltage difference between the two terminals of the light-emitting element 20 is too small to drive the light-emitting element 20 to emit light.

In an embodiment, the display panel includes a first display mode and a second display mode, and the brightness of the display panel in the first display mode is different from the brightness of the display panel in the second display mode. In the first display mode, the first power supply voltage terminal provides the first voltage V11 for a duration of T12, and in the second display mode, the first power supply voltage terminal provides the first voltage V11 for a duration of T22, where T12≠T22.

When the driving current applied to the light-emitting element is maintained at a constant level so that the light-emitting element is driven at an optimal light emission efficiency, the ratio of energy utilization can be improved. Under this condition, to realize the first display mode and the second display mode with different light emission brightnesses of the display panel, for example, to display the same picture but present different brightnesses, it is necessary to adjust the lengths of the light emission periods of the two display modes to achieve different visual brightnesses because the brightnesses of the light-emitting element are basically the same during the same light-emission time due to the same magnitude of the driving currents. The duration of the first power supply voltage terminal providing the first voltage V11 corresponds to the length of the light emission period, and the brightness in the first display mode and the brightness in the second display mode are different, then T12≠T22. In this case, the power supply voltage terminal provides the second voltage V21 in the non-light emission stage, which not only realizes different brightness display of the display panel, but also avoids the light-emitting element from weakly emitting light in the non-light emission stage and affecting the display effect.

Figure 7:
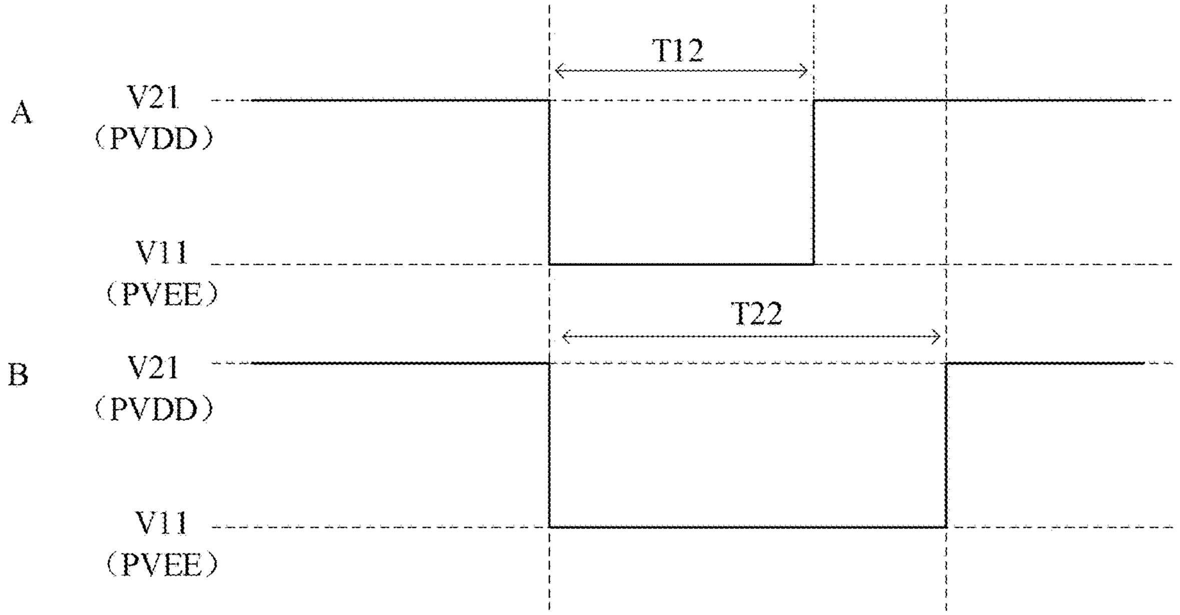
FIG. 7 is a schematic diagram of durations for which a first power supply voltage terminal provides a first voltage in different display modes in a display panel according to an embodiment of the present disclosure.

For example, FIG. 7 is a schematic diagram of durations for which a first power supply voltage terminal provides a first voltage in different display modes in a display panel according to an embodiment of the present disclosure. Referring to FIG. 7, in an embodiment, the display panel includes a first display mode A and a second display mode B, and the first power supply voltage terminal provides the first voltage V11 for a duration of T12 in the first display mode A, and the first power supply voltage terminal provides the first voltage V11 for a duration of T22 in the second display mode B. The brightness of the display panel in the first display mode A is less than the brightness of the display panel in the second display mode B, and T12<T22.

The first power supply voltage terminal provides the first voltage V11 in the light emission stage and provides the second voltage V21 in the non-light emission stage, where the first voltage V11 is PVEE and the second voltage V21 is PVDD, which is only illustrative and not a limitation of the embodiment of the present disclosure. If the brightness of the display panel in the first display mode A is less than the brightness of the display panel in the second display mode B, the duration of the light emission period in the second display mode B is longer, that is, T12<T22.

Figure 8:
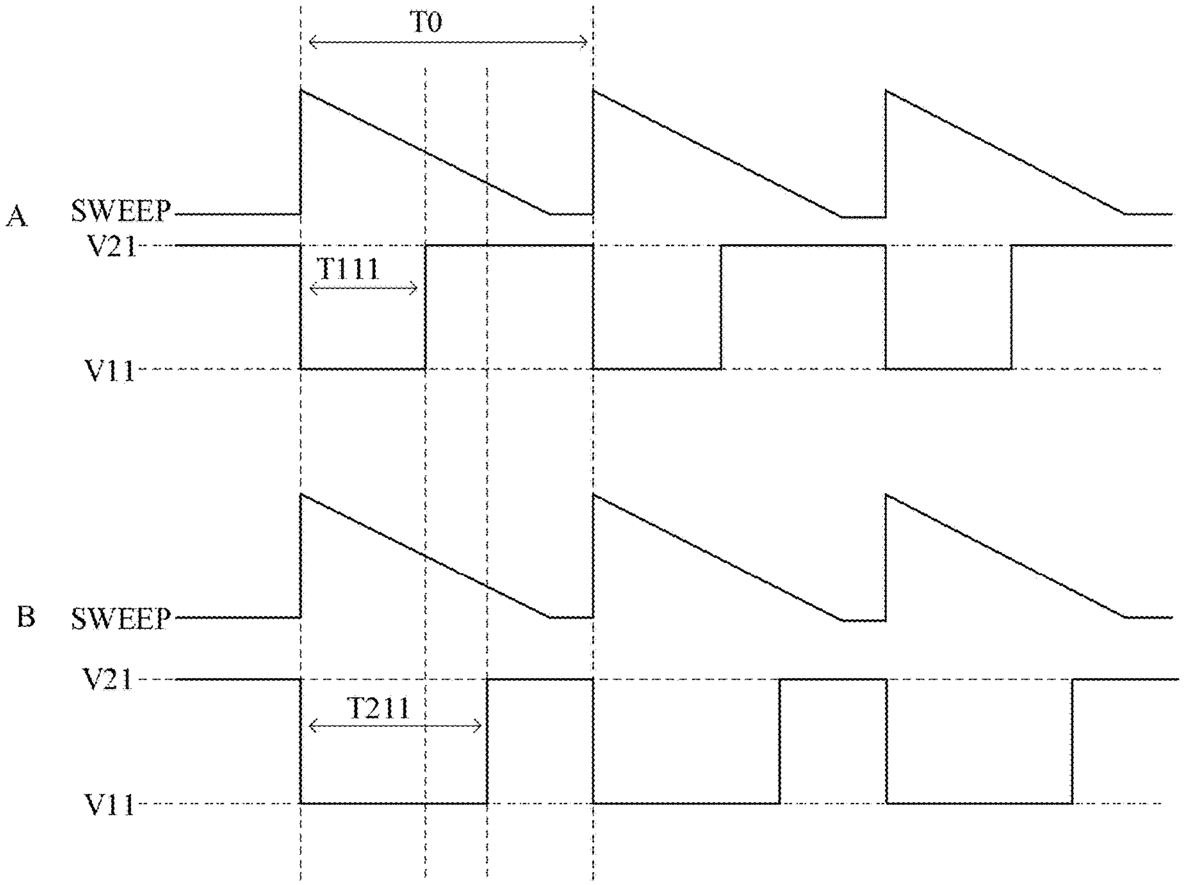
FIG. 8 is a schematic diagram of durations for which a first power supply voltage terminal provides a first voltage in different display modes in a display panel according to an embodiment of the present disclosure.

FIG. 8 is a schematic diagram of durations for which a first power supply voltage terminal provides a first voltage in different display modes in a display panel according to an embodiment of the present disclosure. Referring to FIG. 8, similar to the embodiment shown in FIG. 6, in the PWM+PAM dimming process, the greater the duty cycle of the first voltage V11 provided by the first power supply voltage terminal, the higher the brightness of the light-emitting element, that is, when the brightness in the first display mode A is less than the brightness in the second display mode B, within a pulse cycle T0 of the pulse width modulation signal, the duration T111 for which the first power supply voltage terminal provides the first voltage V11 in the first display mode A is less than the duration T211 for which the first power supply voltage terminal provides the first voltage V11 in the second display mode B, that is, T111<T211.

Figure 9:
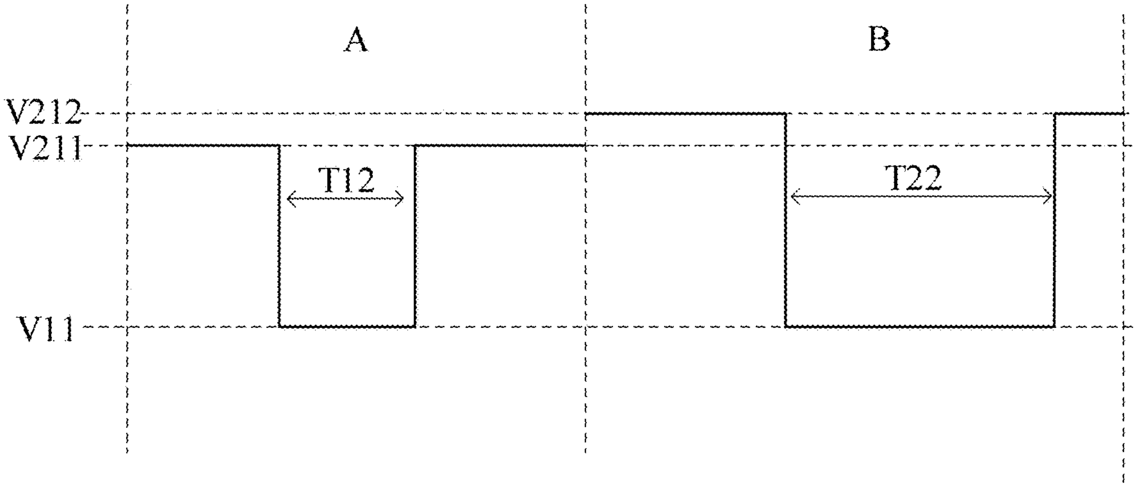
FIG. 9 is a schematic diagram of second voltages provided by a first power supply voltage terminal in different display modes in a display panel according to an embodiment of the present disclosure.

FIG. 9 is a schematic diagram of second voltages provided by a first power supply voltage terminal in different display modes in a display panel according to an embodiment of the present disclosure. Referring to FIG. 9, in an embodiment, in the first display mode A, a second voltage provided by the first power supply voltage terminal is V211, and in the second display mode B, a second voltage provided by the first power supply voltage terminal is V212, where V211≠V212.

In the previous embodiment, the second voltage provided by the first power supply voltage terminal in the non-light emission stage may be a constant anode power supply voltage PVDD, but in the specific implementation, PVDD being of a fixed voltage means that PVDD is a fixed voltage for a period of time and does not mean that PVDD is always constant. For example, in some applications requiring high contrast, when higher brightness is required, the voltage of PVDD may be increased if conditions permit, so as to increase the driving current during high-brightness display, thereby obtaining greater brightness. In an embodiment, the brightness of the first display mode A is less than the brightness of the second display mode B, and V211<V212.

Continuing to refer to FIG. 2 or FIG. 4, in an embodiment, the power supply voltage terminal 30 includes a second power supply voltage terminal 32, and the second power supply voltage terminal 32 is coupled to the light-emitting element 20 through the pixel circuit 10.

In the light emission stage, a first voltage provided by the second power supply voltage terminal 32 is V12, and in the non-light emission stage, a second voltage provided by the second power supply voltage terminal 32 is V22; where V12>V22.

In this embodiment, the second power supply voltage terminal 32 is connected to the pixel circuit 10 and is the positive power supply voltage terminal P1. The pixel circuit 10 is connected to the first electrode (anode) of the light-emitting element 20. In the light emission stage, the first voltage V12 provided by the second power supply voltage terminal 32 to the pixel circuit 10 is a high voltage, for example, the positive power supply voltage PVDD in the related art, to allow the driving current to flow from the second power supply voltage terminal 32 via the pixel circuit 10 through the light-emitting element 20 to ensure that the light-emitting element 20 emits light normally. In the non-light emission stage, the second voltage V12 provided by the second power supply voltage terminal 32 to the pixel circuit 10 is a low voltage, for example, the negative power supply voltage PVEE in the related art, so that even if the thin film transistor in the pixel circuit 10 has an off-state leakage current, the situation in which the light-emitting element 20 emits light weakly in the non-light emission stage can be avoided because there is no voltage difference between the two terminals of the light-emitting element 20 or the voltage difference between the two terminals of the light-emitting element 20 is too small to drive the light-emitting element 20 to emit light.

In an embodiment, the display panel includes a first display mode and a second display mode, and the brightness of the display panel in the first display mode is different from the brightness of the display panel in the second display mode. In the first display mode, the second power supply voltage terminal provides the first voltage V12 for a duration of T13, and in the second display mode, the second power supply voltage terminal provides the first voltage V12 for a duration of T23, where T13≠T23.

When the driving current applied to the light-emitting element is maintained at a constant level so that the light-emitting element is driven at an optimal light emission efficiency, the ratio of energy utilization can be improved. Under this condition, to realize the first display mode and the second display mode with different light emission brightnesses of the display panel, for example, to display the same picture but present different brightnesses, it is necessary to adjust the lengths of the light emission periods of the two display modes to achieve different visual brightnesses because the brightnesses of the light-emitting element are basically the same during the same light-emission time due to the same magnitude of the driving currents. The duration of the second power supply voltage terminal providing the first voltage V12 corresponds to the length of the light emission period, and the brightness in the first display mode and the brightness in the second display mode are different, then T13≠T23. In this case, the power supply voltage terminal provides a second voltage V22 in the non-light emission stage, which not only realizes different brightness display of the display panel, but also avoids the light-emitting element from weakly emitting light in the non-light emission stage and affecting the display effect.

Figure 10:
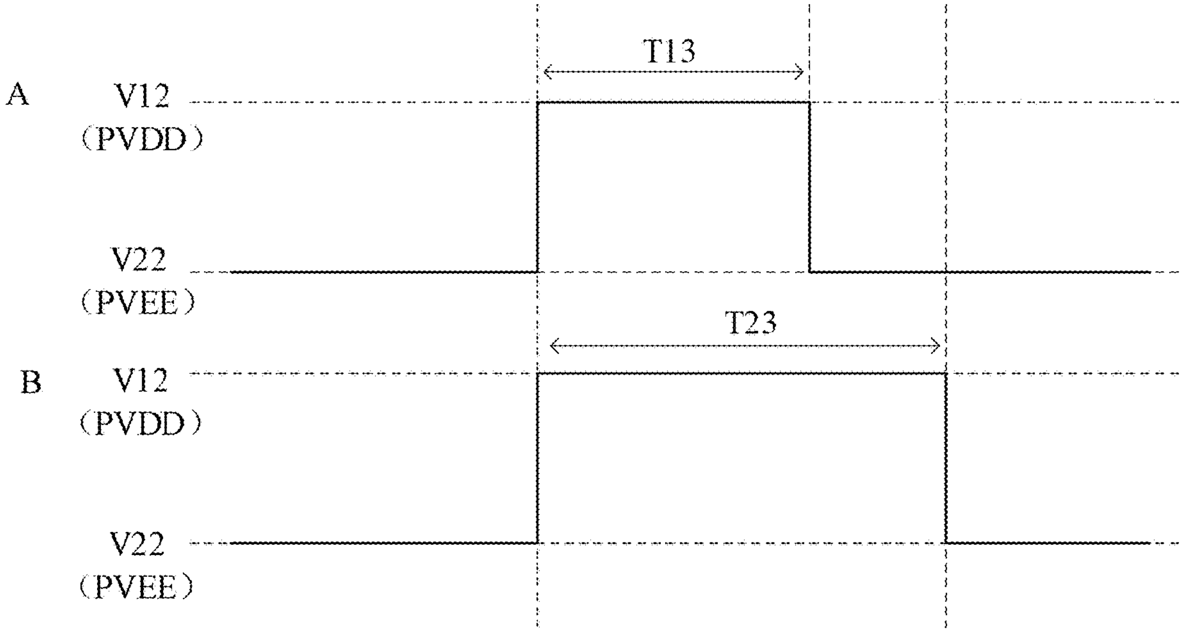
FIG. 10 is a schematic diagram of durations for a second power supply voltage terminal to provide a first voltage in different display modes in a display panel according to an embodiment of the present disclosure.

For example, FIG. 10 is a schematic diagram of durations for which a second power supply voltage terminal provides a first voltage in different display modes in a display panel according to an embodiment of the present disclosure. Referring to FIG. 10, in an embodiment, the display panel includes a first display mode A and a second display mode B, and the second power supply voltage terminal provides the first voltage V12 for a duration of T13 in the first display mode A, and the second power supply voltage terminal provides the first voltage V12 for a duration of T23 in the second display mode B. The brightness of the display panel in the first display mode A is less than the brightness of the display panel in the second display mode B, and T13<T23.

The second power supply voltage terminal provides the first voltage V12 in the light emission stage and provides the second voltage V22 in the non-light emission stage, where the first voltage V12 is PVDD and the second voltage V22 is PVEE, which is only illustrative and not a limitation of the embodiment of the present disclosure. If the brightness of the display panel in the first display mode A is less than the brightness of the display panel in the second display mode B, the duration of the light emission period in the second display mode B is longer, that is, T13<T23.

Figure 11:
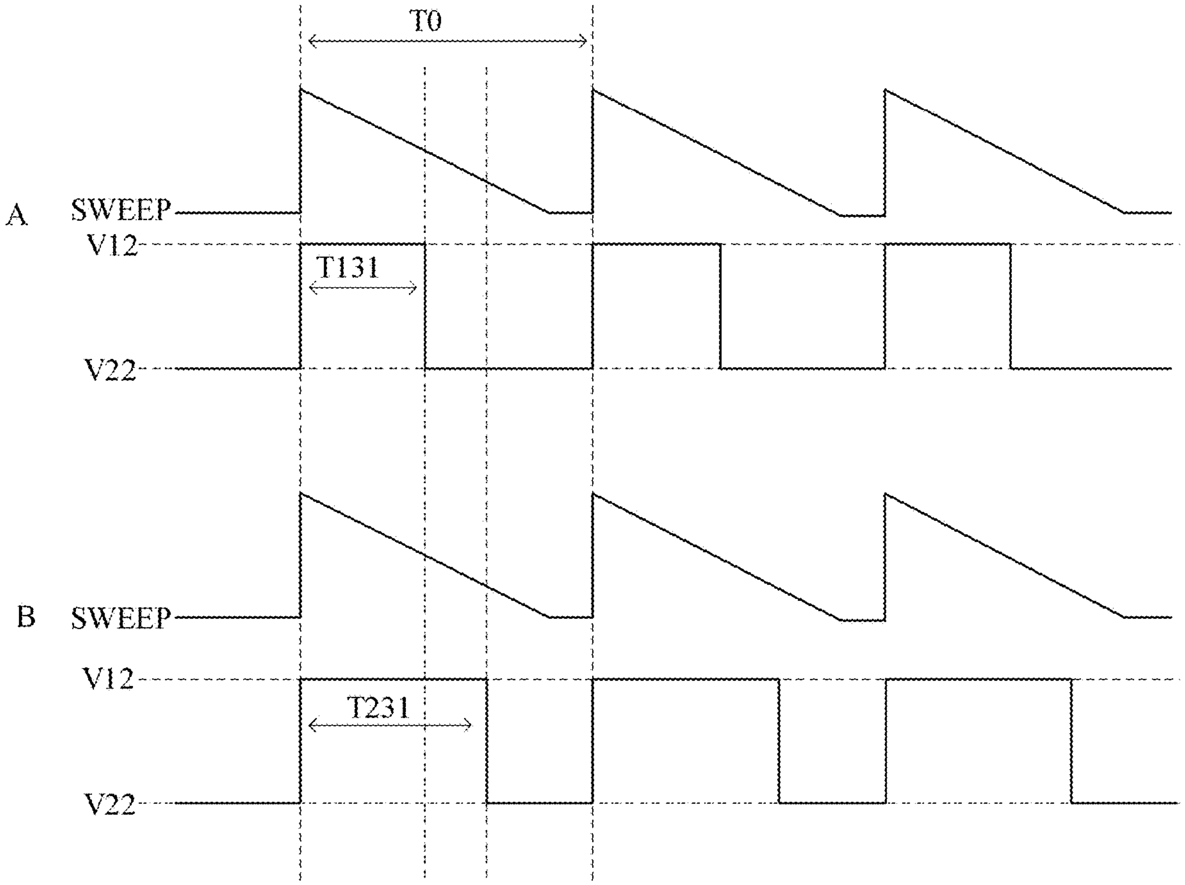
FIG. 11 is a schematic diagram of durations for a second power supply voltage terminal to provide a first voltage in different display modes in a display panel according to an embodiment of the present disclosure.

FIG. 11 is a schematic diagram of durations for which a second power supply voltage terminal provides a first voltage in different display modes in a display panel according to an embodiment of the present disclosure. Referring to FIG. 11, similar to the embodiment shown in FIG. 8, in the PWM+PAM dimming process, the greater the duty cycle of the first voltage V12 provided by the second power supply voltage terminal, the higher the brightness of the light-emitting element, that is, when the brightness of the first display mode A is less than the brightness of the second display mode B, within a pulse cycle T0 of the pulse width modulation signal, the duration T131 for which the second power supply voltage terminal provides the first voltage V12 in the first display mode A is less than the duration T231 for which the second power supply voltage terminal provides the first voltage V12 in the second display mode B, that is, T131<T231.

Figure 12:
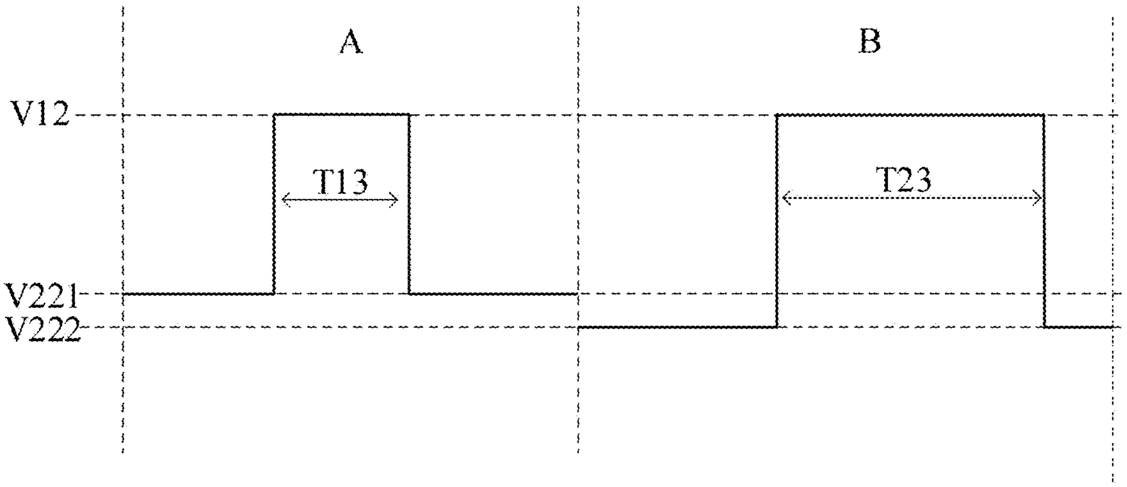
FIG. 12 is a schematic diagram of second voltages provided by a first power supply voltage terminal in different display modes in a display panel according to an embodiment of the present disclosure.

FIG. 12 is a schematic diagram of second voltages provided by a first power supply voltage terminal in different display modes in a display panel according to an embodiment of the present disclosure. Referring to FIG. 12, in an embodiment, in the first display mode A, a second voltage provided by the second power supply voltage terminal is V221, and in the second display mode B, a second voltage provided by the second power supply voltage terminal is V222, where V221≠V222.

In the previous embodiment, the second voltage provided by the second power supply voltage terminal in the non-light emission stage may be a constant negative power supply voltage PVEE, but in the specific implementation, PVEE being of a fixed voltage means that PVEE is a fixed voltage for a period of time and does not mean that PVEE is always constant. For example, in some specific applications scenarios, when lower brightness is required, the voltage of PVEE may be increased properly if conditions permit, so as to decrease the driving current during low-brightness display, thereby obtaining lower brightness. In an embodiment, the brightness of the first display mode A is less than the brightness of the second display mode B, and V221>V222.

Figure 13:
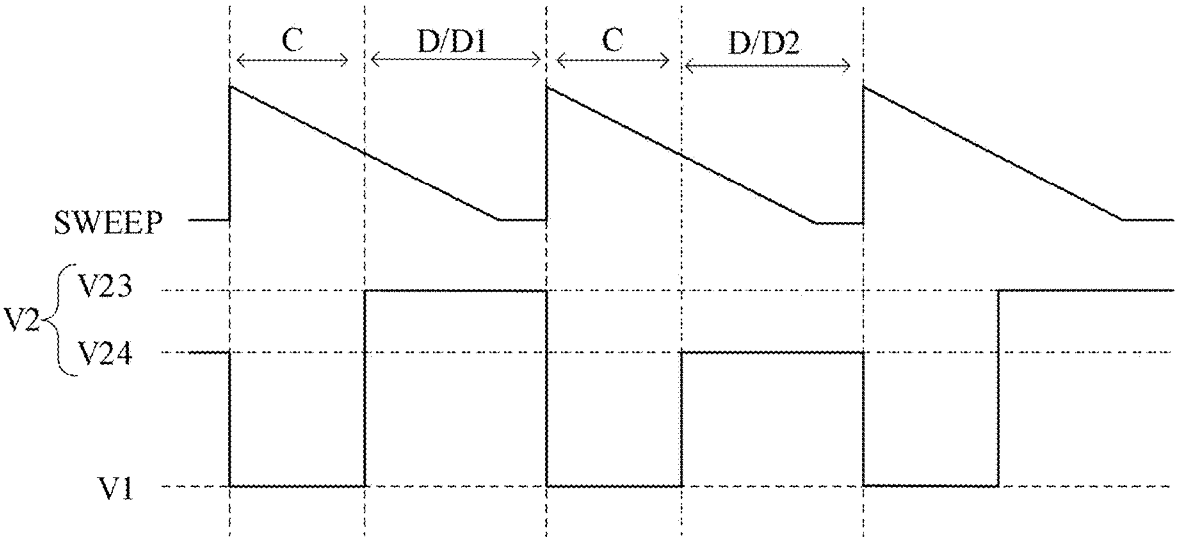
FIG. 13 is a schematic diagram of a voltage provided by a power supply voltage terminal under the control of the same pulse width modulation signal in a display panel according to an embodiment of the present disclosure.

FIG. 13 is a schematic diagram of a voltage provided by a power supply voltage terminal under the control of the same pulse width modulation signal in a display panel according to an embodiment of the present disclosure. Referring to FIG. 13, for the same pulse width modulation signal (corresponding to a sweep signal SWEEP), the display panel includes a light emission stage C and a non-light emission stage D, and the power supply voltage terminal provides a first voltage V1 in the light emission stage C and a second voltage V2 in the non-light emission stage. In an embodiment, the non-light emission stage D includes multiple non-light emission sub-stages, and the multiple non-light emission sub-stages include at least a first non-light emission sub-stage D1 and a second non-light emission sub-stage D2, and in the first non-light emission sub-stage D1, a second voltage provided by the power supply voltage terminal is V23, and in the second non-light emission sub-stage D2, a second voltage provided by the power supply voltage terminal is V24, where V23≠V24.

It can be understood that the embodiment shown in FIG. 13 may be applied to the structure shown in FIG. 1, where the first voltage is a low voltage and the second voltage is a high voltage. In practical application, the second voltage may float within a preset high voltage range according to practical conditions, that is, V23≠V24 is designed. For the structure shown in FIG. 2, the first voltage is a high voltage and the second voltage is a low voltage. The specific implementation is similar to this and is not described in detail here.

In other embodiments, V23=V24 may also be designed according to practical conditions, and may be designed according to practical conditions during implementation.

In an exemplary implementation, the display panel may include display modes with different brightnesses, and second voltages in the non-light emission sub-stages may be set different in the same display mode. In an embodiment, the display panel includes a first display mode and a second display mode, and the brightness of the display panel in the first display mode is different from the brightness of the display panel in the second display mode. In the first display mode, a second voltage provided by the power supply voltage terminal in the first non-light emission sub-stage is V231, and a second voltage provided by the power supply voltage terminal in the second non-light emission sub-stage is V241, where V231≠V241, and/or in the second display mode, a second voltage provided by the power supply voltage terminal in the first non-light emission sub-stage is V232, and a second voltage provided by the power supply voltage terminal in the second non-light emission sub-stage is V242, where V232≠V242.

Figure 14:
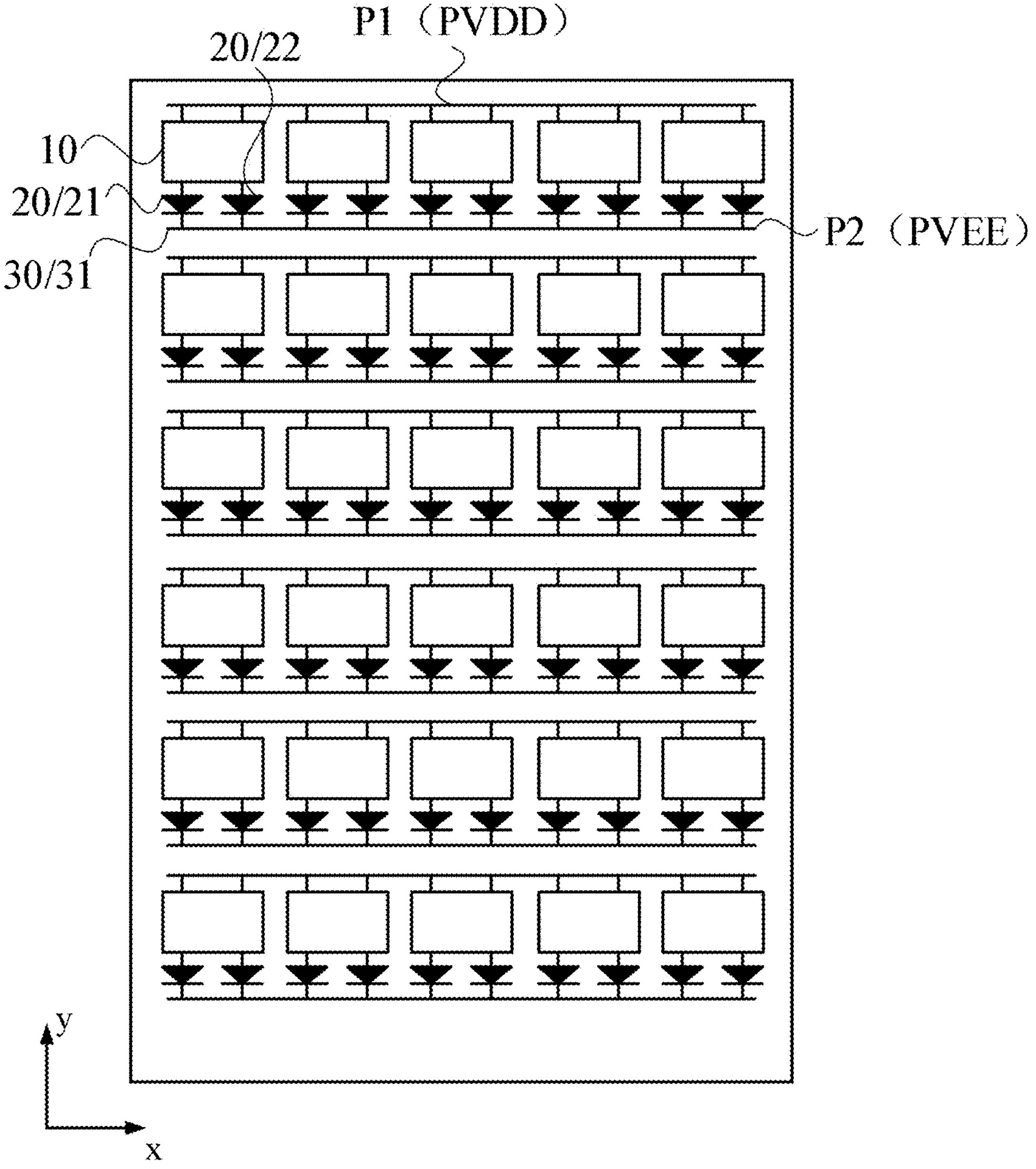
FIG. 14 is a schematic structural diagram of another display panel according to an embodiment of the present disclosure.

FIG. 14 is a schematic structural diagram of another display panel according to an embodiment of the present disclosure. Referring to FIG. 14, in an embodiment, the light-emitting element 20 includes a first light-emitting element 21 and a second light-emitting element 22, the first light-emitting element 21 and the second light-emitting element 22 are electrically connected to the same pixel circuit 10, and the pixel circuit 10 drives the first light-emitting element 21 or the second light-emitting element 22 to emit light.

In this embodiment, it is designed that one pixel circuit 10 is connected to two light-emitting elements, the light-emitting elements connected to the same pixel circuit 10 are the same, and the second light-emitting element 22 is used as a backup light-emitting element. When the first light-emitting element 21 fails, the pixel circuit 10 drives the second light-emitting element 22 to emit light, so as to improve the reliability of the display panel.

Figure 15:
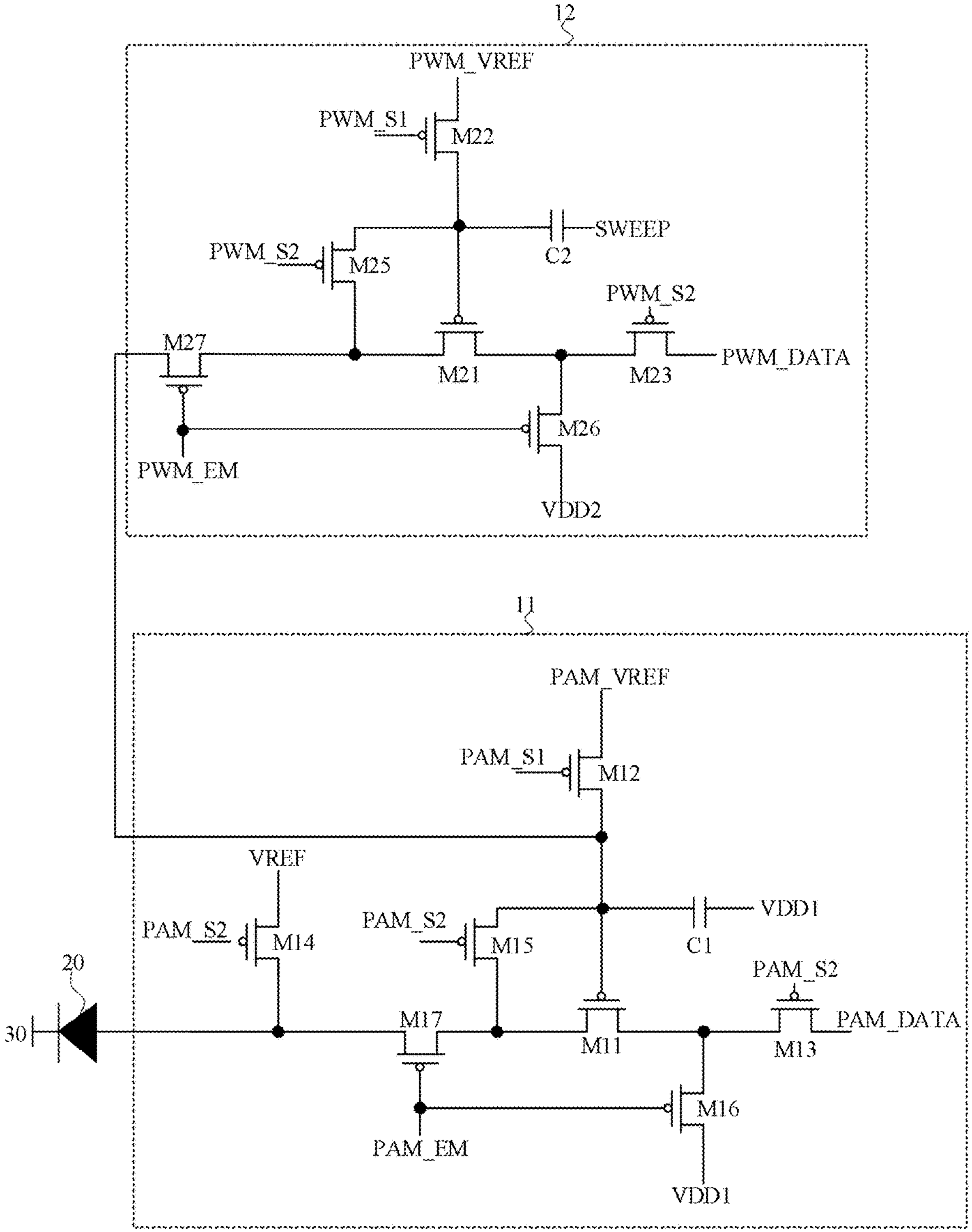
FIG. 15 is a schematic structural diagram of a pixel circuit according to an embodiment of the present disclosure.

The specific structure of the pixel circuit is not limited in the embodiment of the present disclosure. Taking the power supply voltage terminal coupled to the pixel circuit through the light-emitting element as an example, FIG. 15 is a schematic structural diagram of a pixel circuit according to an embodiment of the present disclosure. Referring to FIG. 15, in an embodiment, the pixel circuit includes an amplitude modulation module 11 and a pulse width modulation module 12. The amplitude modulation module 11 is configured to control the amplitude of the driving current, and the pulse width modulation module 12 is configured to output a pulse width modulation signal to control the duration of the driving current applied to the light-emitting element 20. The amplitude modulation module 11 includes a first driving transistor M11, and an output terminal of the pulse width modulation module 12 is electrically connected to a gate of the first driving transistor M11.

In an embodiment, the amplitude modulation module 11 further includes a first initialization transistor M12, a first data writing transistor M13, a second initialization transistor M14, a first threshold compensation transistor M15, a first light-emission control transistor M16, a second light-emission control transistor M17 and a first capacitor C1. A first terminal of the first capacitor C1, a second electrode of the first initialization transistor M12, and a first electrode of the first threshold compensation transistor M15 are all electrically connected to the gate of the first driving transistor M11. A second electrode of the first data writing transistor M13 and a second electrode of the first light-emission control transistor M16 are all electrically connected to a first electrode of the first driving transistor M11. A second electrode of the first threshold compensation transistor M15 and a first electrode of the second light-emission control transistor M17 are all electrically connected to a second electrode of the first driving transistor M11. A gate of the first initialization transistor M12 is electrically connected to a scanning signal terminal PAM_S1, and a first electrode of the first initialization transistor M12 is electrically connected to a reference signal terminal PAM_VREF. A gate of the first data writing transistor M13 is electrically connected to a scanning signal terminal PAM_S2, a first electrode of the first data writing transistor M13 is electrically connected to a data signal terminal PAM_DATA. A gate of the second initialization transistor M14 is electrically connected to the scanning signal terminal PAM_S2, the first electrode of the second initialization transistor M14 is electrically connected to a reference signal terminal VREF, a second electrode of the second initialization transistor M14 and a second electrode of the second light-emission control transistor M17 are electrically connected, and both are connected to the first electrode of the light-emitting element 20. A first electrode of the first light-emission control transistor M16 and a second terminal of the first capacitor C1 are both electrically connected to the voltage terminal VDD1. A gate of the first light-emission control transistor M16 and a gate of the second light-emission control transistor M17 are both electrically connected to the light-emission control signal terminal PAM_EM, and the second electrode of the light-emitting element 20 is electrically connected to the power supply voltage terminal 30.

The pulse width modulation module 12 includes a second driving transistor M21, a third initialization transistor M22, a second data writing transistor M23, a second threshold compensation transistor M25, a third light-emission control transistor M26, a fourth light-emission control transistor M27 and a second capacitor C2. A first terminal of the second capacitor C2, a second electrode of the third initialization transistor M22, and a first electrode of the second threshold compensation transistor M25 are all electrically connected to a gate of the second driving transistor M21. A second terminal of the second capacitor C2 is electrically connected to the sweep signal SWEEP. A second electrode of the second data writing transistor M23 and a second electrode of the third light-emission control transistor M26 are all electrically connected to a first electrode of the second driving transistor M21. A second electrode of the second threshold compensation transistor M25 and a first electrode of the fourth light-emission control transistor M27 are all electrically connected to a second electrode of the second driving transistor M21. A gate of the third initialization transistor M22 is electrically connected to a scanning signal terminal PWM_S1. A first electrode of the third initialization transistor M22 is electrically connected to a reference signal terminal PWM_VREF. A gate of the second data writing transistor M23 is electrically connected to a scanning signal terminal PWM_S2. A first electrode of the second data writing transistor M23 is electrically connected to a data signal terminal PWM_DATA. A second electrode of the fourth light-emission control transistor M27 is the output terminal of the pulse width modulation module 12, and is electrically connected to the gate of the first driving transistor M11. A first electrode of the third light-emission control transistor M26 is electrically connected to a voltage terminal VDD2. A gate of the third light-emission control transistor M26 and a gate of the fourth light-emission control transistor M27 are both electrically connected to the light-emission control signal terminal PWM_EM.

The basic principle of the pulse modulation module 12 controlling the light emission duration of the light-emitting element is as follows: during the light emission period of the light-emitting element, the sweep signal terminal receives a ramp signal (SWEEP, i.e., a sweep signal) in the shape of a triangular wave, whose voltage value rises or falls linearly with time. The pulse modulation module 12 controls, according to the SWEEP signal, the duty cycle of the driving current provided by the pixel circuit to the light-emitting element during the light emission stage, thereby controlling the brightness of the light-emitting element. That is, the larger the duty cycle, the higher the brightness of the light-emitting element perceived by the human eye, and the smaller the duty cycle, the lower the brightness of the light-emitting element perceived by the human eye. The actual light-emission intensity of the light-emitting element is controlled by the magnitude of the driving current.

Figure 16:
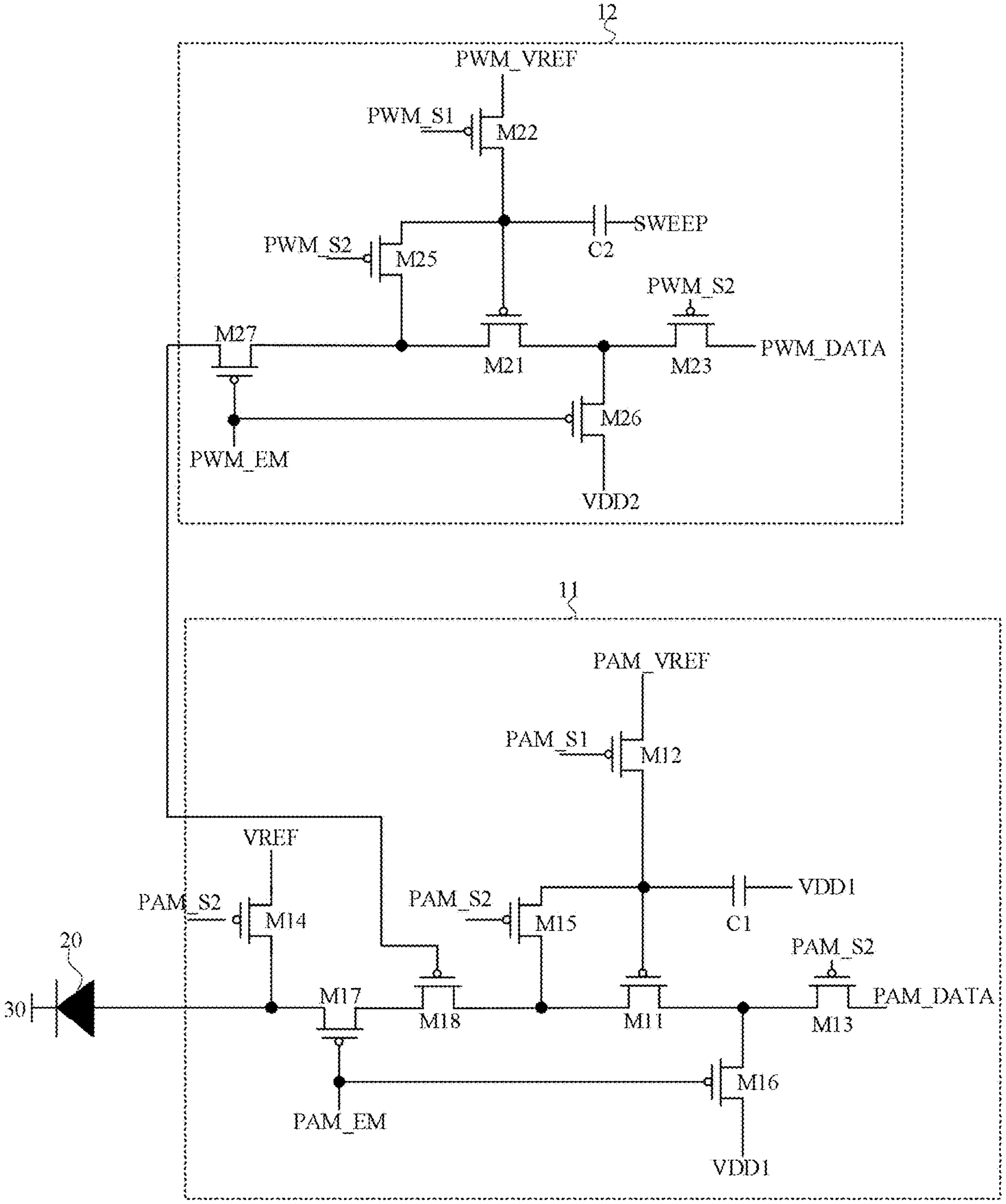
FIG. 16 is a schematic structural diagram of another pixel circuit according to an embodiment of the present disclosure.

FIG. 16 is a schematic structural diagram of another pixel circuit according to an embodiment of the present disclosure. Referring to FIG. 16, in an embodiment, the pixel circuit includes an amplitude modulation module 11 and a pulse width modulation module 12. The amplitude modulation module 11 is configured to control the amplitude of the driving current, and the pulse width modulation module 12 is configured to output a pulse width modulation signal to control the duration of the driving current applied to the light-emitting element 20. The amplitude modulation module includes a first driving transistor M11 and a control transistor M18, and the control transistor M18 is connected between the first driving transistor M11 and the light-emitting element 20; and an output terminal of the pulse width modulation module 12 is electrically connected to a gate of the control transistor M18.

Different from the pixel circuit shown in FIG. 15, the output terminal of the pulse width modulation module 12 in the embodiment of FIG. 16 is not directly electrically connected to the gate of the first driving transistor M11, but a control transistor M18 is provided between the first driving transistor M11 and the light-emitting element 20, and the output terminal of the pulse width modulation module 12 is electrically connected to the gate of the control transistor M18. The other basic structures are the same as those in FIG. 15, and are not described in detail here.

Figure 17:
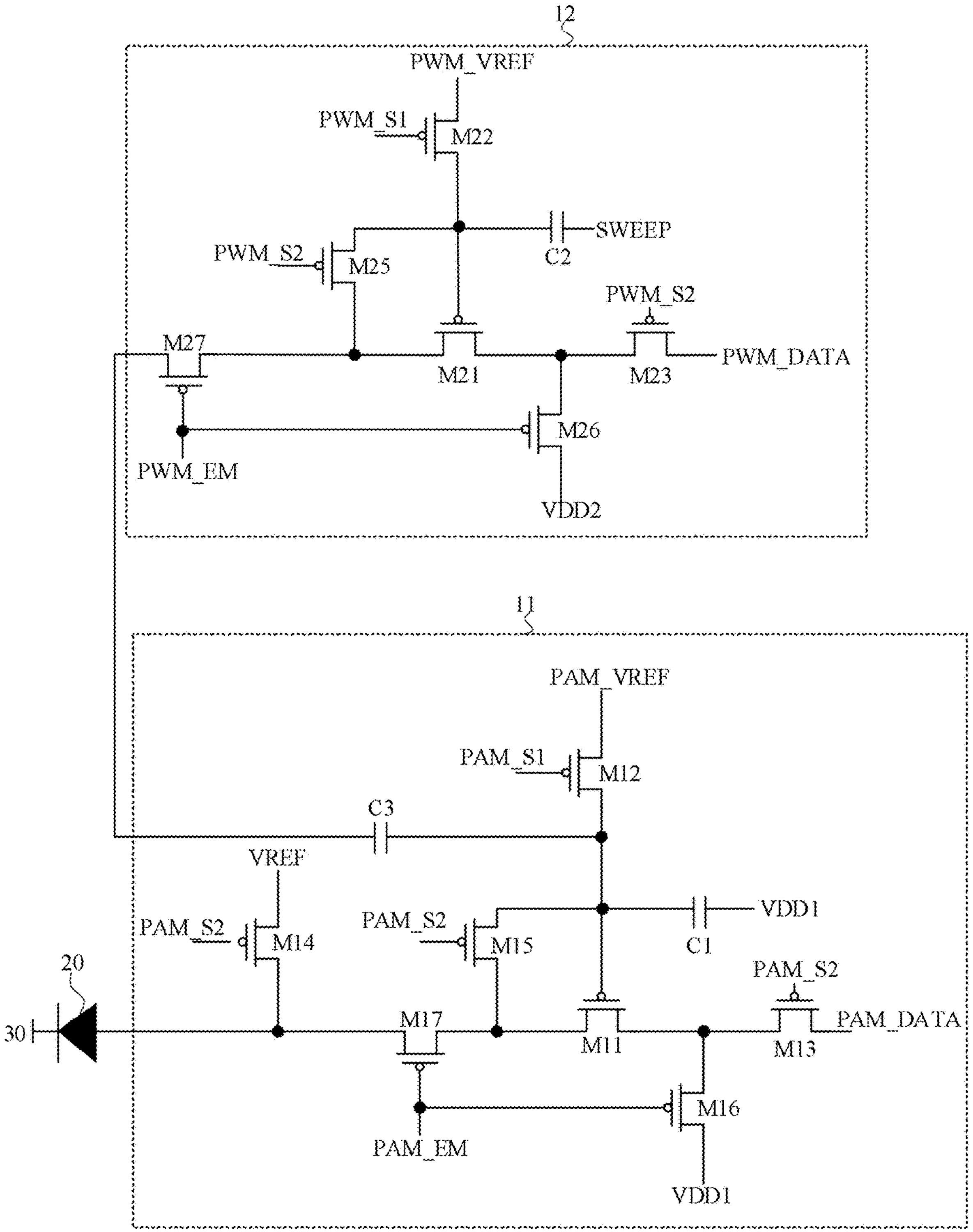
FIG. 17 is a schematic structural diagram of still another pixel circuit according to an embodiment of the present disclosure.

FIG. 17 is a schematic structural diagram of still another pixel circuit according to an embodiment of the present disclosure. Referring to FIG. 17, in an embodiment, the pixel circuit includes an amplitude modulation module 11 and a pulse width modulation module 12. The amplitude modulation module 11 is configured to control the amplitude of the driving current, and the pulse width modulation module 12 is configured to output a pulse width modulation signal to control the duration of the driving current applied to the light-emitting element 20. The amplitude modulation module 11 includes a first driving transistor M11, and the pixel circuit further includes a connection capacitor C3. An output terminal of the pulse width modulation module 12 is electrically connected to a first terminal of the connection capacitor C3, and a second terminal of the connection capacitor C3 is electrically connected to the gate of the first driving transistor M11.

Different from the pixel circuit shown in FIG. 15, in the embodiment of FIG. 17, the output terminal of the pulse width modulation module 12 is electrically connected to the gate of the first driving transistor M11 through the connection capacitor C3, and the pulse width modulation signal is transmitted to the amplitude modulation module 11 through the coupling effect of the capacitor.

Figure 18:
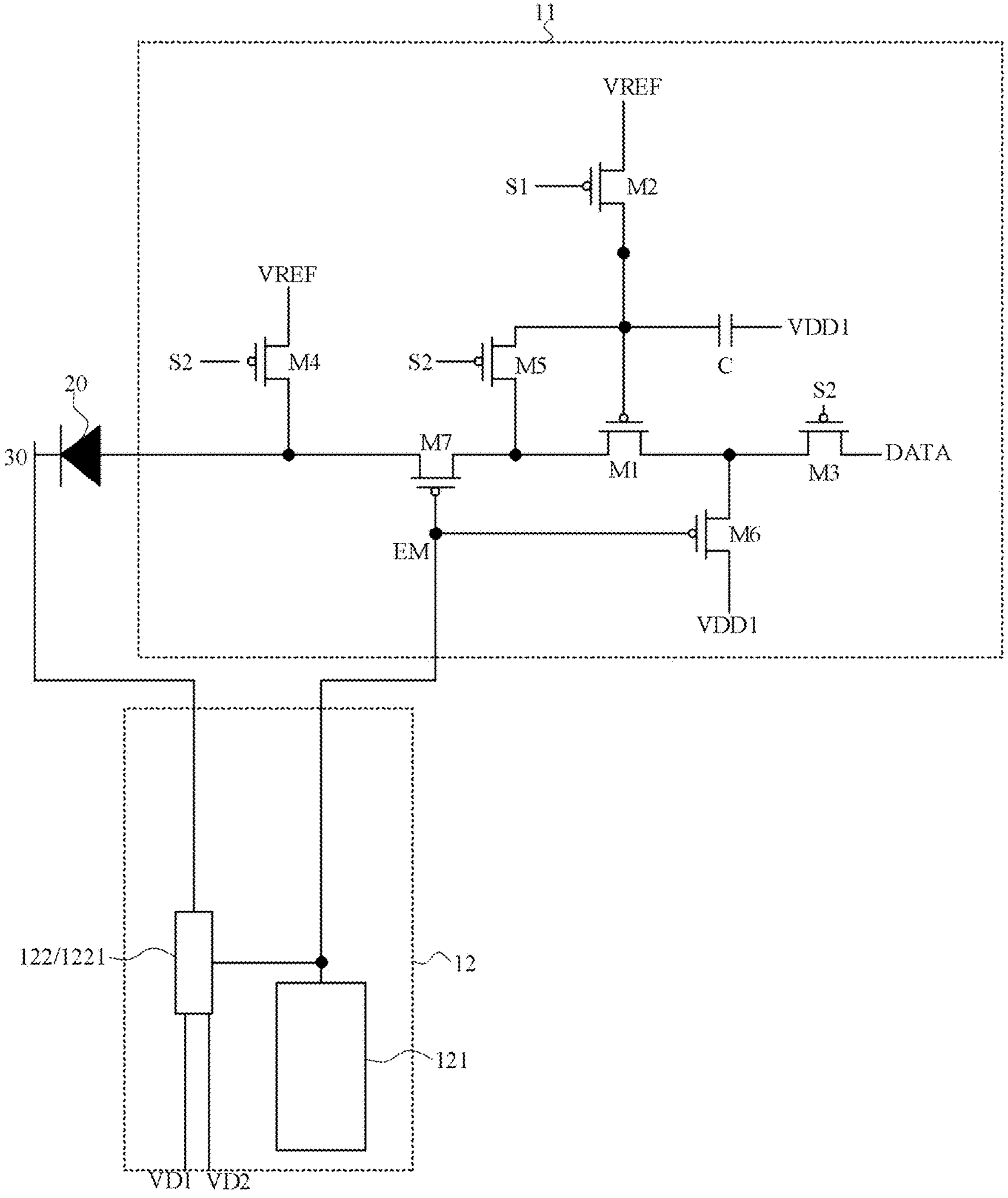
FIG. 18 is a schematic structural diagram of yet still another pixel circuit according to an embodiment of the present disclosure.

FIG. 18 is a schematic structural diagram of yet still another pixel circuit according to an embodiment of the present disclosure. Referring to FIG. 18, in an embodiment, the pixel circuit includes an amplitude modulation module 11 and a pulse width modulation module 12. The amplitude modulation module 11 is configured to control the amplitude of the driving current, and the pulse width modulation module 12 is configured to output a pulse width modulation signal to control the duration of the driving current applied to the light-emitting element 20. The pulse width modulation module 12 includes a logic control unit 121 and a voltage control unit 122. An output terminal of the logic control unit 121 is electrically connected to a control terminal of the voltage control unit 122. The logic control unit 121 is configured to output the pulse width modulation signal. An output terminal of the voltage control unit 122 is a power supply voltage terminal and is configured to output a first voltage V1 in the light emission stage and a second voltage V2 in the non-light emission stage.

The pulse width modulation module 12 may be a micro integrated circuit (micro IC), and the amplitude modulation module 11 may be embodied as a 7T1C circuit including seven transistors and one capacitor. Its basic structure is similar to the amplitude modulation module structure in the aforementioned embodiments and is not described in detail this time. The pulse width modulation signal PWM output by the pulse width modulation module 12 controls the conduction of the light-emission control transistors (M6 and M7), thereby controlling the light emission duration.

In an embodiment, referring to FIG. 18, the voltage control unit 122 includes a multiplexer 1221, a first input terminal of the multiplexer is electrically connected to a first constant voltage terminal VD1, a second input terminal of the multiplexer 1221 is electrically connected to a second constant voltage terminal VD2, a control terminal of the multiplexer 1221 is electrically connected to the output terminal of the logic control unit 121. The logic control unit is configured to output a pulse width modulation signal. An output terminal of the multiplexer 1221 is the power supply voltage terminal, and the multiplexer 1221 is configured to output a first voltage provided by the first constant voltage terminal VD1 in the light emission stage of the display panel and output a second voltage provided by the second constant voltage terminal VD2 in the non-light emission stage of the display panel according to the pulse width modulation signal.

Exemplarily, the first constant voltage terminal VD1 may provide a low level, and the second constant voltage terminal VD2 may provide a high level. In this embodiment, the output terminal of the multiplexer 1221 and a cathode of the light-emitting element 20 are taken as examples, in the light emission stage, the multiplexer 1221 outputs a low level, and in the non-light emission stage, the multiplexer 1221 outputs a high level. In an exemplary implementation, the multiplexer 1221 may include an N-type transistor and a P-type transistor, and realizes a low level or a high level output under the control of the pulse width modulation signal output by the pulse width modulation module 12.

Figure 19:
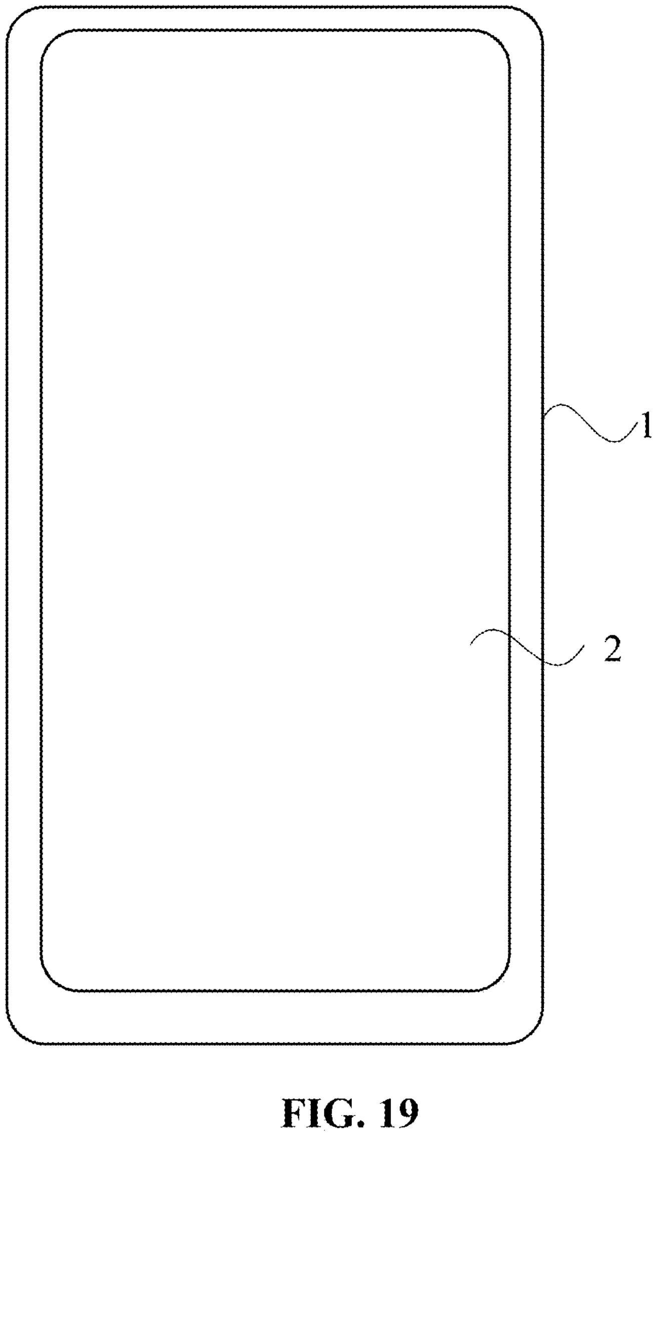
FIG. 19 is a schematic structural diagram of a display device according to an embodiment of the present disclosure.

FIG. 19 is a schematic structural diagram of a display device according to an embodiment of the present disclosure. Referring to FIG. 19, the display device 1 includes any display panel 2 according to an embodiment of the present disclosure. The display device 1 may be a mobile phone, a computer, and a smart wearable device.

It is to be noted that the preceding are only preferred embodiments of the present disclosure and technical principles used therein. It will be understood by a person skilled in the art that the present disclosure is not limited to the embodiments described herein. The person skilled in the art can make various apparent changes, readjustments, combinations and substitutions without departing from the scope of the present disclosure. Therefore, while the present disclosure has been described in detail through the above-described embodiments, the present disclosure is not limited to the above-described embodiments and may include more other equivalent embodiments without departing from the concept of the present disclosure. The scope of the present disclosure is determined by the scope of the appended claims.

What is claimed is:

1. A display panel, comprising:

a pixel circuit;

a light-emitting element; and a power supply voltage terminal;

wherein the pixel circuit provides a driving current for the light-emitting element, and the power supply voltage terminal provides a power supply voltage signal for the pixel circuit;

wherein the display panel comprises a light emission stage and a non-light emission stage, wherein in the light emission stage, the power supply voltage terminal provides a first voltage V1, and wherein in the non-light emission stage, the power supply voltage terminal provides a second voltage V2, wherein V1≠V2; and wherein the display panel comprises a first display mode and a second display mode, wherein a brightness of the display panel in the first display mode is less than a brightness of the display panel in the second display mode;

wherein in the first display mode, the power supply voltage terminal provides the first voltage V1 for a duration of T1 in the light emission stage, and wherein in the second display mode, the power supply voltage terminal provides the first voltage V1 for a duration of T2 in the light emission stage, wherein T1<T2;

wherein the pixel circuit comprises an amplitude modulation module and a pulse width modulation module;

wherein the amplitude modulation module is configured to control an amplitude of the driving current, and the pulse width modulation module is configured to output a pulse width modulation signal to control a duration of the driving current applied to the display panel;

wherein in the first display mode and the second display mode, the pulse width modulation module outputs pulse width modulation signals with a same frequency;

wherein in the first display mode, a duration of the power supply voltage terminal providing the first voltage V1 within a pulse cycle of the pulse width modulation signal in the light emission stage is T11, and wherein in the second display mode, a duration of the power supply voltage terminal providing the first voltage V1 within a pulse cycle of the pulse width modulation signal in the light emission stage is T21, wherein T11<T21.

2. The display panel according to claim 1, wherein the power supply voltage terminal comprises a first power supply voltage terminal;

wherein the first power supply voltage terminal is coupled to the pixel circuit through the light-emitting element;

wherein in the light emission stage, a first voltage provided by the first power supply voltage terminal is V11, and wherein in the non-light emission stage, a second voltage provided by the first power supply voltage terminal is V21; wherein V11<V21.

3. The display panel according to claim 2, wherein in the first display mode, the first power supply voltage terminal provides the first voltage V11 for a duration of T12 in the light emission stage, and in the second display mode, the first power supply voltage terminal provides the first voltage V11 for a duration of T22 in the light emission stage, wherein T12<T22.

4. The display panel according to claim 3, wherein in the first display mode, a second voltage provided by the first power supply voltage terminal in the non-light emission stage is V211, and in the second display mode, a second voltage provided by the first power supply voltage terminal in the non-light emission stage is V212, wherein V211≠V212.

5. The display panel according to claim 4, wherein V211<V212.

6. The display panel according to claim 1, wherein the power supply voltage terminal comprises a second power supply voltage terminal;

wherein the second power supply voltage terminal is coupled to the light-emitting element through the pixel circuit;

wherein in the light emission stage, a first voltage provided by the second power supply voltage terminal is V12, and wherein in the non-light emission stage, a second voltage provided by the second power supply voltage terminal is V22; wherein V12>V22.

7. The display panel according to claim 6, wherein in the first display mode, the second power supply voltage terminal provides the first voltage V12 for a duration of T13 in the light emission stage, and in the second display mode, the second power supply voltage terminal provides the first voltage V12 for a duration of T23 in the light emission stage, wherein T13<T23.

8. The display panel according to claim 7, wherein in the first display mode, a second voltage provided by the second power supply voltage terminal in the non-light emission stage is V221, and in the second display mode, a second voltage provided by the second power supply voltage terminal in the non-light emission stage is V222, wherein V221≠V222.

9. The display panel according to claim 8, wherein V221>V222.

10. The display panel according to claim 1, wherein the non-light emission stage comprises a plurality of non-light emission sub-stages;

wherein the plurality of non-light emission sub-stages comprise at least a first non-light emission sub-stage and a second non-light emission sub-stage, wherein in the first non-light emission sub-stage, a second voltage provided by the power supply voltage terminal is V23, and wherein in the second non-light emission sub-stage, a second voltage provided by the power supply voltage terminal is V24, wherein V23≠V24.

11. The display panel according to claim 10, wherein the display panel further satisfies at least one of the following:

in the first display mode, a second voltage provided by the power supply voltage terminal in the first non-light emission sub-stage is V231, and a second voltage provided by the power supply voltage terminal in the second non-light emission sub-stage is V241, wherein V231≠V241; or in the second display mode, a second voltage provided by the power supply voltage terminal in the first non-light emission sub-stage is V232, and a second voltage provided by the power supply voltage terminal in the second non-light emission sub-stage is V242, wherein V232≠V242.

12. The display panel according to claim 1, wherein the light-emitting element comprises a first light-emitting element and a second light-emitting element, the first light-emitting element and the second light-emitting element are electrically connected to a same pixel circuit, and the pixel circuit drives the first light-emitting element or the second light-emitting element to emit light.

13. A display device, comprising a display panel, wherein the display panel comprises:

a pixel circuit;

a light-emitting element; and a power supply voltage terminal;

wherein the pixel circuit provides a driving current for the light-emitting element, and the power supply voltage terminal provides a power supply voltage signal for the pixel circuit;

wherein the display panel comprises a light emission stage and a non-light emission stage, wherein in the light emission stage, the power supply voltage terminal provides a first voltage V1, and wherein in the non-light emission stage, the power supply voltage terminal provides a second voltage V2, wherein V1≠V2; and wherein the display panel comprises a first display mode and a second display mode, wherein a brightness of the display panel in the first display mode is less than a brightness of the display panel in the second display mode;

wherein in the first display mode, the power supply voltage terminal provides the first voltage V1 for a duration of T1 in the light emission stage, and wherein in the second display mode, the power supply voltage terminal provides the first voltage V1 for a duration of T2 in the light emission stage, wherein T1<T2;

wherein the pixel circuit comprises an amplitude modulation module and a pulse width modulation module;

wherein the amplitude modulation module is configured to control an amplitude of the driving current, and the pulse width modulation module is configured to output a pulse width modulation signal to control a duration of the driving current applied to the display panel;

wherein in the first display mode and the second display mode, the pulse width modulation module outputs pulse width modulation signals with a same frequency;

wherein in the first display mode, a duration of the power supply voltage terminal providing the first voltage V1 within a pulse cycle of the pulse width modulation signal in the light emission stage is T11, and wherein in the second display mode, a duration of the power supply voltage terminal providing the first voltage V1 within a pulse cycle of the pulse width modulation signal in the light emission stage is T21, wherein T11<T21.

14. A display panel, comprising:

a pixel circuit;

a light-emitting element; and a power supply voltage terminal;

wherein the pixel circuit provides a driving current for the light-emitting element, and the power supply voltage terminal provides a power supply voltage signal for the pixel circuit;

wherein the display panel comprises a light emission stage and a non-light emission stage, wherein in the light emission stage, the power supply voltage terminal provides a first voltage V1, and wherein in the non-light emission stage, the power supply voltage terminal provides a second voltage V2, wherein V1≠V2; and wherein the pixel circuit comprises an amplitude modulation module and a pulse width modulation module, wherein the amplitude modulation module is configured to control an amplitude of the driving current, and the pulse width modulation module is configured to output a pulse width modulation signal to control a duration of the driving current applied to the light-emitting element, wherein the display panel further satisfies one of the following:

the amplitude modulation module comprises a first driving transistor, and an output terminal of the pulse width modulation module is electrically connected to a gate of the first driving transistor;

the amplitude modulation module comprises a first driving transistor and a control transistor, and the control transistor is connected between the first driving transistor and the light-emitting element; and an output terminal of the pulse width modulation module is electrically connected to a gate of the control transistor;

the amplitude modulation module comprises a first driving transistor, and the pixel circuit further comprises a connection capacitor, an output terminal of the pulse width modulation module is electrically connected to a first terminal of the connection capacitor, and a second terminal of the connection capacitor is electrically connected to a gate of the first driving transistor;

the pulse width modulation module comprises a logic control unit and a voltage control unit, an output terminal of the logic control unit is electrically connected to a control terminal of the voltage control unit, the logic control unit is configured to output the pulse width modulation signal, and an output terminal of the voltage control unit is the power supply voltage terminal and is configured to output the first voltage V1 in the light emission stage and output the second voltage V2 in the non-light emission stage.

15. The display panel according to claim 14, wherein in a case where the pulse width modulation module comprises the logic control unit and the voltage control unit, the output terminal of the logic control unit is electrically connected to the control terminal of the voltage control unit, the logic control unit is configured to output the pulse width modulation signal, and the output terminal of the voltage control unit is the power supply voltage terminal and is configured to output the first voltage V1 in the light emission stage and output the second voltage V2 in the non-light emission stage, the voltage control unit comprises a multiplexer, wherein a first input terminal of the multiplexer is electrically connected to a first constant voltage terminal, a second input terminal of the multiplexer is electrically connected to a second constant voltage terminal, a control terminal of the multiplexer is electrically connected to the output terminal of the logic control unit, and an output terminal of the multiplexer is the power supply voltage terminal, and wherein the multiplexer is configured to: output a first voltage provided by the first constant voltage terminal in the light emission stage of the display panel and output a second voltage provided by the second constant voltage terminal in the non-light emission stage of the display panel according to the pulse width modulation signal.

* * * * *